United States Patent
Hosseini et al.

(10) Patent No.: US 12,207,205 B2
(45) Date of Patent: Jan. 21, 2025

(54) DUAL CONNECTIVITY POWER CONTROL

(71) Applicant: QUALCOMM Incorporated, San Diego, CA (US)

(72) Inventors: Seyedkianoush Hosseini, San Diego, CA (US); Jing Jiang, San Diego, CA (US); Heechoon Lee, San Diego, CA (US); Gavin Bernard Horn, La Jolla, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 17/814,657

(22) Filed: Jul. 25, 2022

(65) Prior Publication Data

US 2024/0031947 A1    Jan. 25, 2024

(51) Int. Cl.
*H04W 52/34*    (2009.01)
*H04W 52/36*    (2009.01)
*H04W 52/38*    (2009.01)

(52) U.S. Cl.
CPC ....... *H04W 52/346* (2013.01); *H04W 52/367* (2013.01); *H04W 52/38* (2013.01)

(58) Field of Classification Search
CPC . H04W 52/346; H04W 52/367; H04W 52/38; H04W 52/146; H04W 52/281; H04W 52/40
See application file for complete search history.

(56) References Cited

U.S. PATENT DOCUMENTS

| | | | | |
|---|---|---|---|---|
| 10,973,019 | B2* | 4/2021 | Marinier | H04W 52/365 |
| 2011/0302431 | A1* | 12/2011 | Diab | H04L 41/32 |
| | | | | 713/310 |
| 2015/0215943 | A1* | 7/2015 | Vajapeyam | H04W 72/0473 |
| | | | | 370/329 |
| 2017/0223763 | A1* | 8/2017 | Rahman | H04W 76/15 |
| 2017/0339676 | A1* | 11/2017 | Belghoul | H04W 72/20 |
| 2020/0068495 | A1* | 2/2020 | Yang | H04W 52/325 |
| 2020/0204318 | A1* | 6/2020 | Thangarasa | H04W 74/0833 |
| 2020/0389848 | A1* | 12/2020 | Ji | H04L 1/203 |
| 2022/0217032 | A1* | 7/2022 | Ko | H04L 27/26025 |
| 2022/0225184 | A1* | 7/2022 | Dalsgaard | H04W 36/00692 |
| 2022/0272650 | A1* | 8/2022 | Ko | H04W 56/0045 |
| 2022/0322118 | A1* | 10/2022 | Kim | H04L 5/0053 |
| 2023/0354203 | A1* | 11/2023 | Zhou | H04W 52/241 |

* cited by examiner

*Primary Examiner* — Dominic E Rego
(74) *Attorney, Agent, or Firm* — Harrity & Harrity, LLP

(57) ABSTRACT

Various aspects of the present disclosure generally relate to wireless communication. In some aspects, a user equipment (UE) may receive, while in dual connectivity with a carrier of a second cell group, a first grant for a first communication on a carrier of a first cell group. The UE may determine an allocated power for the first cell group by a specified time offset before a start of second cell group transmissions. The UE may receive a second grant, after the first grant, for a second communication on the first cell group. The UE may transmit the first communication with a first transmit power. The UE may transmit the second communication with a second transmit power that is based on the allocated power and the first transmit power and/or a maximum transmit power for the first cell group. Numerous other aspects are described.

30 Claims, 14 Drawing Sheets

DUAL CONNECTIVITY POWER CONTROL

FIELD OF THE DISCLOSURE

Aspects of the present disclosure generally relate to wireless communication and to techniques and apparatuses for dual connectivity power control.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, while in dual connectivity with a carrier of a second cell group, a first grant for a first communication on a carrier of a first cell group. The first cell group may be a master cell group (MCG) and the second cell group may be a secondary cell group (SCG). Alternatively, the first cell group may be an SCG and the second cell group may be an MCG. The method may include determining an allocated power for carriers of the first cell group by a specified time offset before a start of transmissions on carriers of the second cell group. The method may include receiving a second grant, after the first grant, for a second communication on the first cell group. The method may include transmitting the first communication with a first transmit power. The method may include transmitting the second communication with a second transmit power that is based at least in part on the allocated power for carriers of the first cell group and one or more of the first transmit power or a maximum transmit power for the first cell group.

Some aspects described herein relate to a method of wireless communication performed by a UE. The method may include receiving an indication, via downlink control information (DCI) or a medium access control control element (MAC CE), of one or more of a reserved power of a first cell group, a maximum power of the first cell group, a reserved power of a second cell group, or a maximum power of the second cell group. The method may include transmitting a communication with a transmit power that is based at least in part on the indication.

Some aspects described herein relate to a method of wireless communication performed by a network entity. The method may include transmitting an indication, via DCI or a MAC CE, of one or more of a reserved power of a first cell group, a maximum power of the first cell group, a reserved power of a second cell group, or a maximum power of the second cell group. The method may include receiving a communication in association with the indication.

Some aspects described herein relate to a UE for wireless communication. The UE may include a memory and one or more processors coupled to the memory. The one or more processors may be configured to receive, while in dual connectivity with a carrier of a second cell group, a first grant for a first communication on a carrier of a first cell group. The one or more processors may be configured to determine an allocated power for carriers of the first cell group by a specified time offset before a start of transmissions on carriers of the second cell group. The one or more processors may be configured to receive a second grant, after the first grant, for a second communication on the first cell group. The one or more processors may be configured to transmit the first communication with a first transmit power. The one or more processors may be configured to transmit the second communication with a second transmit power that is based at least in part on the allocated power for carriers of the first cell group and one or more of the first transmit power or a maximum transmit power for the first cell group.

Some aspects described herein relate to a UE for wireless communication. The UE may include a memory and one or more processors coupled to the memory. The one or more processors may be configured to receive an indication, via DCI or a MAC CE, of one or more of a reserved power of a first cell group, a maximum power of the first cell group, a reserved power of a second cell group, or a maximum power of the second cell group. The one or more processors may be configured to transmit a communication with a transmit power that is based at least in part on the indication.

Some aspects described herein relate to a network entity for wireless communication. The network entity may include a memory and one or more processors coupled to the memory. The one or more processors may be configured to transmit an indication, via DCI or a MAC CE, of one or more of a reserved power of a first cell group, a maximum power of the first cell group, a reserved power of a second cell group, or a maximum power of the second cell group. The one or more processors may be configured to receive a communication in association with the indication.

Some aspects described herein relate to a non-transitory computer-readable medium that stores a set of instructions for wireless communication by a UE. The set of instructions, when executed by one or more processors of the UE, may cause the UE to receive, while in dual connectivity with a carrier of a second cell group, a first grant for a first communication on a carrier of a first cell group. The set of instructions, when executed by one or more processors of the UE, may cause the UE to determine an allocated power for carriers of the first cell group by a specified time offset before a start of transmissions on carriers of the second cell group. The set of instructions, when executed by one or more processors of the UE, may cause the UE to receive a second grant, after the first grant, for a second communication on the first cell group. The set of instructions, when executed by one or more processors of the UE, may cause the UE to transmit the first communication with a first transmit power. The set of instructions, when executed by one or more processors of the UE, may cause the UE to transmit the second communication with a second transmit power that is based at least in part on the allocated power for carriers of the first cell group and one or more of the first transmit power or a maximum transmit power for the first cell group.

Some aspects described herein relate to a non-transitory computer-readable medium that stores a set of instructions for wireless communication by an UE. The set of instructions, when executed by one or more processors of the UE, may cause the UE to receive an indication, via DCI or a MAC CE, of one or more of a reserved power of a first cell group, a maximum power of the first cell group, a reserved power of a second cell group, or a maximum power of the second cell group. The set of instructions, when executed by one or more processors of the UE, may cause the UE to transmit a communication with a transmit power that is based at least in part on the indication.

Some aspects described herein relate to a non-transitory computer-readable medium that stores a set of instructions for wireless communication by a network entity. The set of instructions, when executed by one or more processors of the network entity, may cause the network entity to transmit an indication, via DCI or a MAC CE, of one or more of a reserved power of a first cell group, a maximum power of the first cell group, a reserved power of a second cell group, or a maximum power of the second cell group. The set of instructions, when executed by one or more processors of the network entity, may cause the network entity to receive a communication in association with the indication.

Some aspects described herein relate to an apparatus for wireless communication. The apparatus may include means for receiving, while in dual connectivity with a carrier of a second cell group, a first grant for a first communication on a carrier of a first cell group. The apparatus may include means for determining an allocated power for carriers of the first cell group by a specified time offset before a start of transmissions on carriers of the second cell group. The apparatus may include means for receiving a second grant, after the first grant, for a second communication on the first cell group. The apparatus may include means for transmitting the first communication with a first transmit power. The apparatus may include means for transmitting the second communication with a second transmit power that is based at least in part on the allocated power for carriers of the first cell group and one or more of the first transmit power or a maximum transmit power for the first cell group.

Some aspects described herein relate to an apparatus for wireless communication. The apparatus may include means for receiving an indication, via DCI or a MAC CE, of one or more of a reserved power of a first cell group, a maximum power of the first cell group, a reserved power of a second cell group, or a maximum power of the second cell group. The apparatus may include means for transmitting a communication with a transmit power that is based at least in part on the indication.

Some aspects described herein relate to an apparatus for wireless communication. The apparatus may include means for transmitting an indication, via DCI or a MAC CE, of one or more of a reserved power of a first cell group, a maximum power of the first cell group, a reserved power of a second cell group, or a maximum power of the second cell group. The apparatus may include means for receiving a communication in association with the indication.

Aspects generally include a method, apparatus, system, computer program product, non-transitory computer-readable medium, user equipment, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
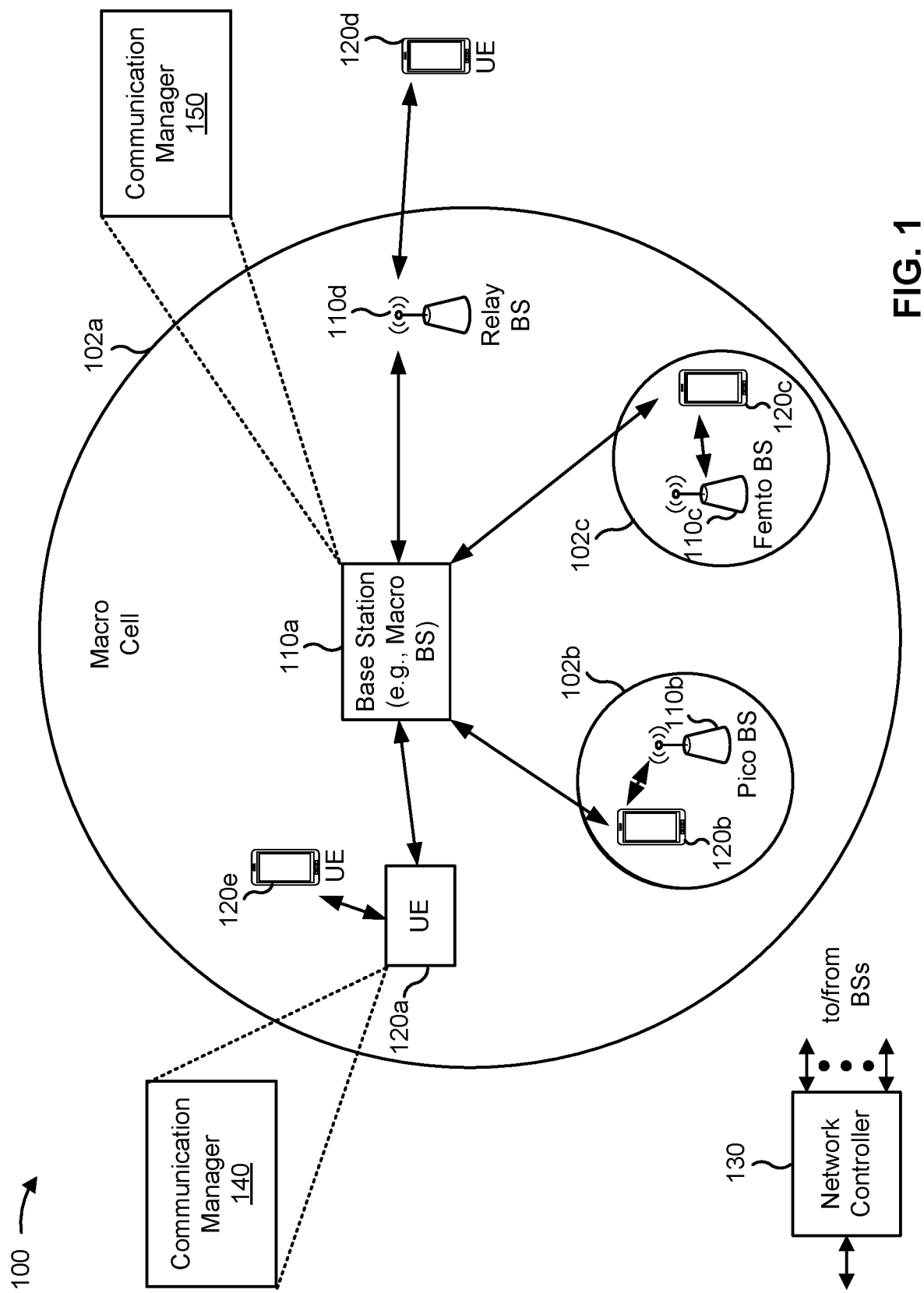
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120a, a UE 120b, a UE 120c, a UE 120d, and a UE 120e). The wireless network 100 may also include one or more network entities, such as base stations 110 (shown as a BS 110a, a BS 110b, a BS 110c, and a BS 110d), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) MC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, while in dual connectivity with a carrier of a second cell group, a first grant for a first communication on a carrier of a first cell group. The communication manager 140 may determine an allocated power for carriers of the first cell group by a specified time offset before a start of transmissions on carriers of the second cell group. The communication manager 140 may receive a second grant, after the first grant, for a second communication on the first cell group. The communication manager 140 may transmit the first communication with a first transmit power. The communication manager 140 may and transmit the second communication with a second transmit power that is based at least in part on the allocated power for carriers of the first cell group and one or more of the first transmit power or a maximum transmit power for the first cell group. Additionally, or alternatively, the communication manager 140 may perform one or more other operations described herein.

In some aspects, the communication manager 140 may receive an indication, via downlink control information (DCI) or a medium access control control element (MAC CE), of one or more of a reserved power of a first cell group, a maximum power of the first cell group, a reserved power of a second cell group, or a maximum power of the second cell group. The communication manager 140 may transmit a communication with a transmit power that is based at least in part on the indication. Additionally, or alternatively, the communication manager 140 may perform one or more other operations described herein.

In some aspects, a network entity (e.g., base station 110) may include a communication manager 150. As described in more detail elsewhere herein, the communication manager 150 may transmit an indication, DCI or a MAC CE, of one or more of a reserved power of a first cell group, a maximum power of the first cell group, a reserved power of a second cell group, or a maximum power of the second cell group. The communication manager 150 may receive a communication in association with the indication. Additionally, or alternatively, the communication manager 150 may perform one or more other operations described herein.

As indicated above, FIG. 1 is provided as an example. Other examples may differ from what is described with regard to FIG. 1.

Figure 2:
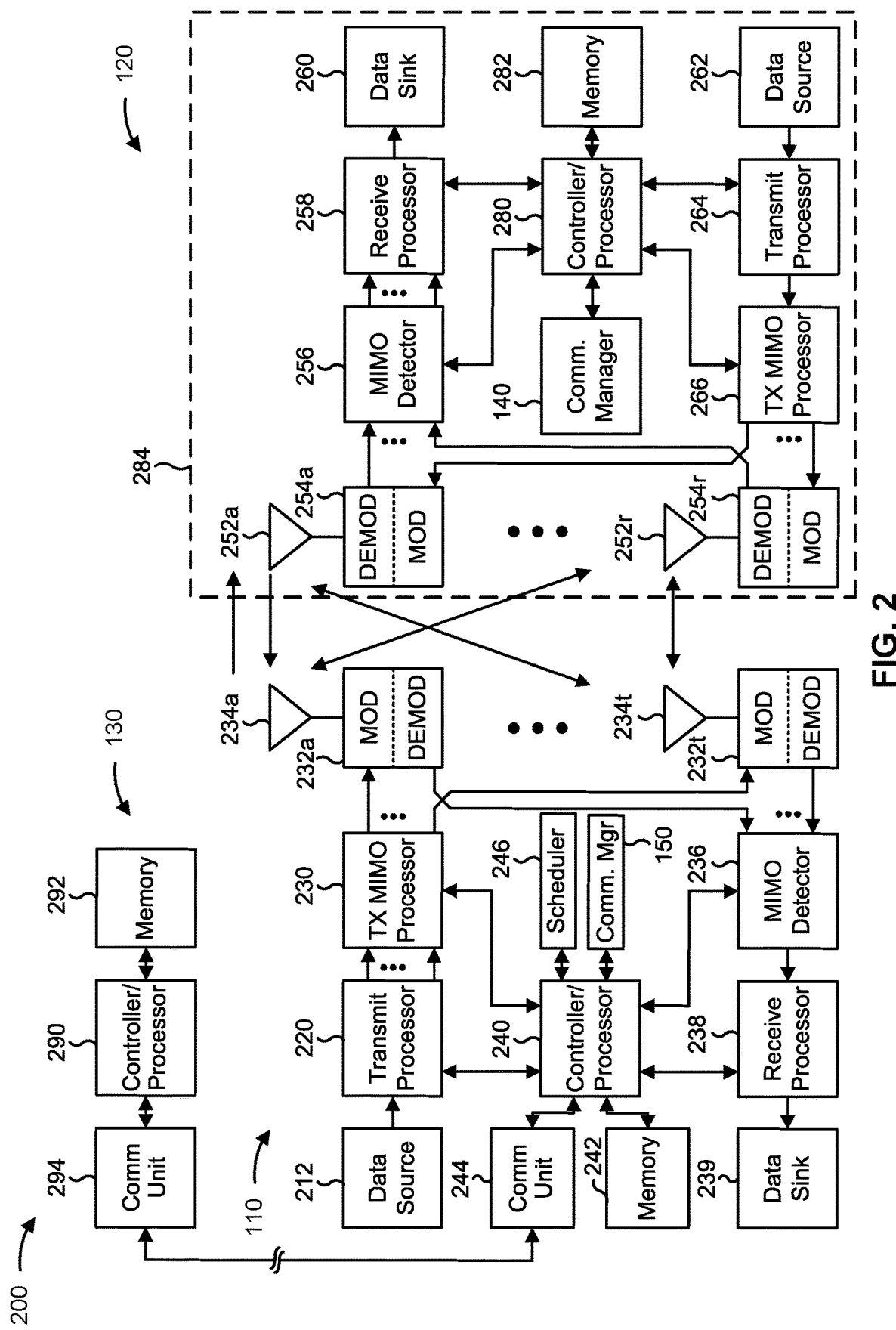
FIG. 2 is a diagram illustrating an example of a network entity in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-14).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-14).

A controller/processor of a network entity (e.g., the controller/processor 240 of the base station 110), the controller/processor 280 of the UE 120, and/or any other component(s) of FIG. 2 may perform one or more techniques associated with dual connectivity power control with multiple TRPs, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, process 1200 of FIG. 12, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 1000 of FIG. 10, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE 120 includes means for receiving, while in dual connectivity with a carrier of a second cell group, a first grant for a first communication on a carrier of a first cell group; means for determining an allocated power for carriers of the first cell group by a specified time offset before a start of transmissions on carriers of the second cell group; means for receiving a second grant, after the first grant, for a second communication on the first cell group; means for transmitting the first communication with a first transmit power; and/or means for transmitting the second communication with a second transmit power that is based at least in part on the allocated power for carriers of the first cell group and one or more of the first transmit power or a maximum transmit power for the first cell group. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving an indication, via DCI or a MAC CE, of one or more of a reserved power of a first cell group, a maximum power of the first cell group, a reserved power of a second cell group, or a maximum power of the second cell group; and/or means for transmitting a communication with a transmit power that is based at least in part on the indication.

In some aspects, a network entity (e.g., base station 110) includes means for transmitting an indication, via DCI or a MAC CE, of one or more of a reserved power of a first cell group, a maximum power of the first cell group, a reserved power of a second cell group, or a maximum power of the second cell group; and/or means for receiving a communication in association with the indication. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
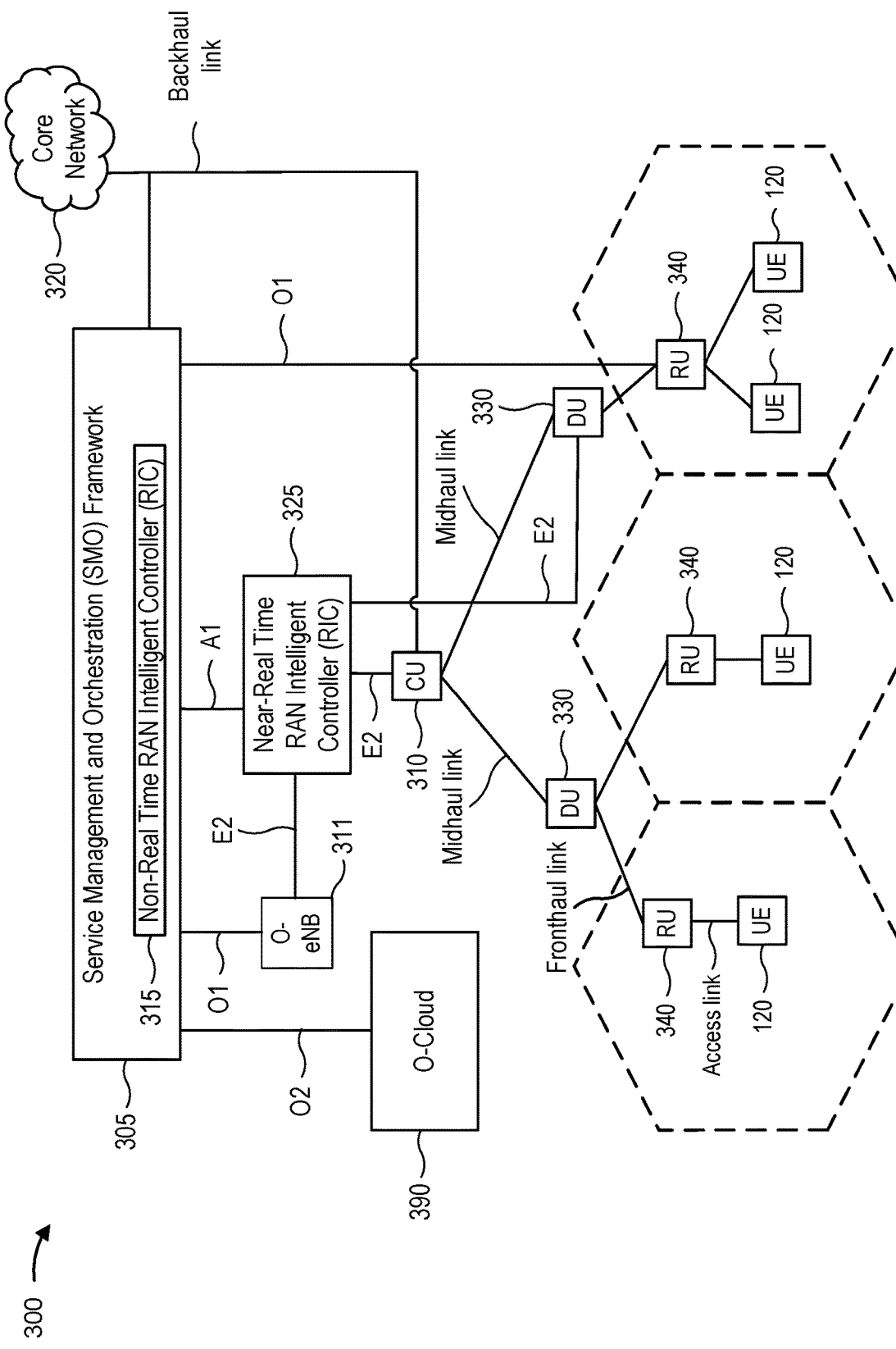
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUs (O-DUs)" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
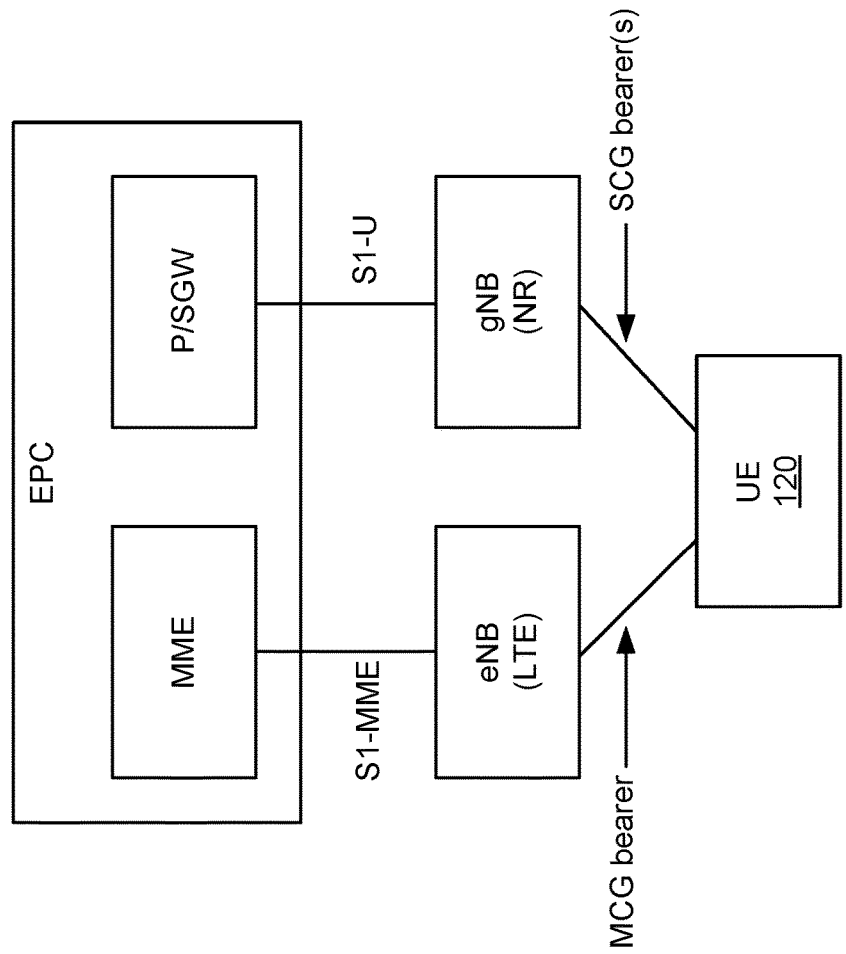
FIG. 4 is a diagram illustrating an example of dual connectivity, in accordance with the present disclosure.

FIG. 4 is a diagram illustrating an example 400 of dual connectivity, in accordance with the present disclosure. The example shown in FIG. 4 is for an Evolved Universal Mobile Telecommunications System Terrestrial Radio Access (E-UTRA)-NR dual connectivity (ENDC) mode. In the ENDC mode, a UE 120 communicates using an LTE RAT on an MCG, and the UE 120 communicates using an NR RAT an SCG. However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, an NEDC mode, an NRDC mode, and/or another type of dual connectivity mode. A mode with both NR or with both NR and 6G may be an NR-NR DC (NNDC) mode. A new mode of operation that includes 6G may more generally be referred to as "multi-RAT connectivity."

As shown in FIG. 4, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or other devices. In FIG. 4, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 4, in some aspects, a wireless network that permits operation in a 5G NSA mode may permit such operations using an MCG for a first RAT (e.g., an LTE RAT or a 4G RAT) and an SCG for a second RAT (e.g., an NR RAT or a 5G RAT). In this case, the UE 120 may communicate with the eNB via the MCG, and may communicate with the gNB via the SCG. In some aspects, the MCG may anchor a network connection between the UE 120 and the 4G/LTE core network (e.g., for mobility, coverage, and/or control plane information), and the SCG may be added as additional carriers to increase throughput (e.g., for data traffic and/or user plane information). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs) and/or signaling radio bearers (SRBs)). For example, the UE 120 may transmit or receive data via the MCG and/or the SCG using one or more DRBs. Similarly, the UE 120 may transmit or receive control information (e.g., radio resource control (RRC) information and/or measurement reports) using one or more SRBs. In some aspects, a radio bearer may be dedicated to a specific cell group (e.g., a radio bearer may be an MCG bearer or an SCG bearer). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

The UE may share power between multiple TRPs, such as in an NRDC mode or an NNDC mode. Power control for the NNDC mode may include at least two semi-static power sharing modes. In Mode 1, there may be a semi-statically fixed power split for an MCG and an SCG. A sum transmit power for the MCG may be capped by a maximum power $P_{MCG}$ for the MCG. A sum transmit power for the SCG may be capped by a maximum power $P_{SCG}$ for the SCG. A sum transmit power of $P_{MCG}$ and $P_{SCG}$ may be less than or equal to a total power $P_{total}$ configured for the UE. In each cell group, an uplink carrier aggregation prioritization rule may be used.

As indicated above, FIG. 4 is provided as an example. Other examples may differ from what is described with regard to FIG. 4.

Figure 5:
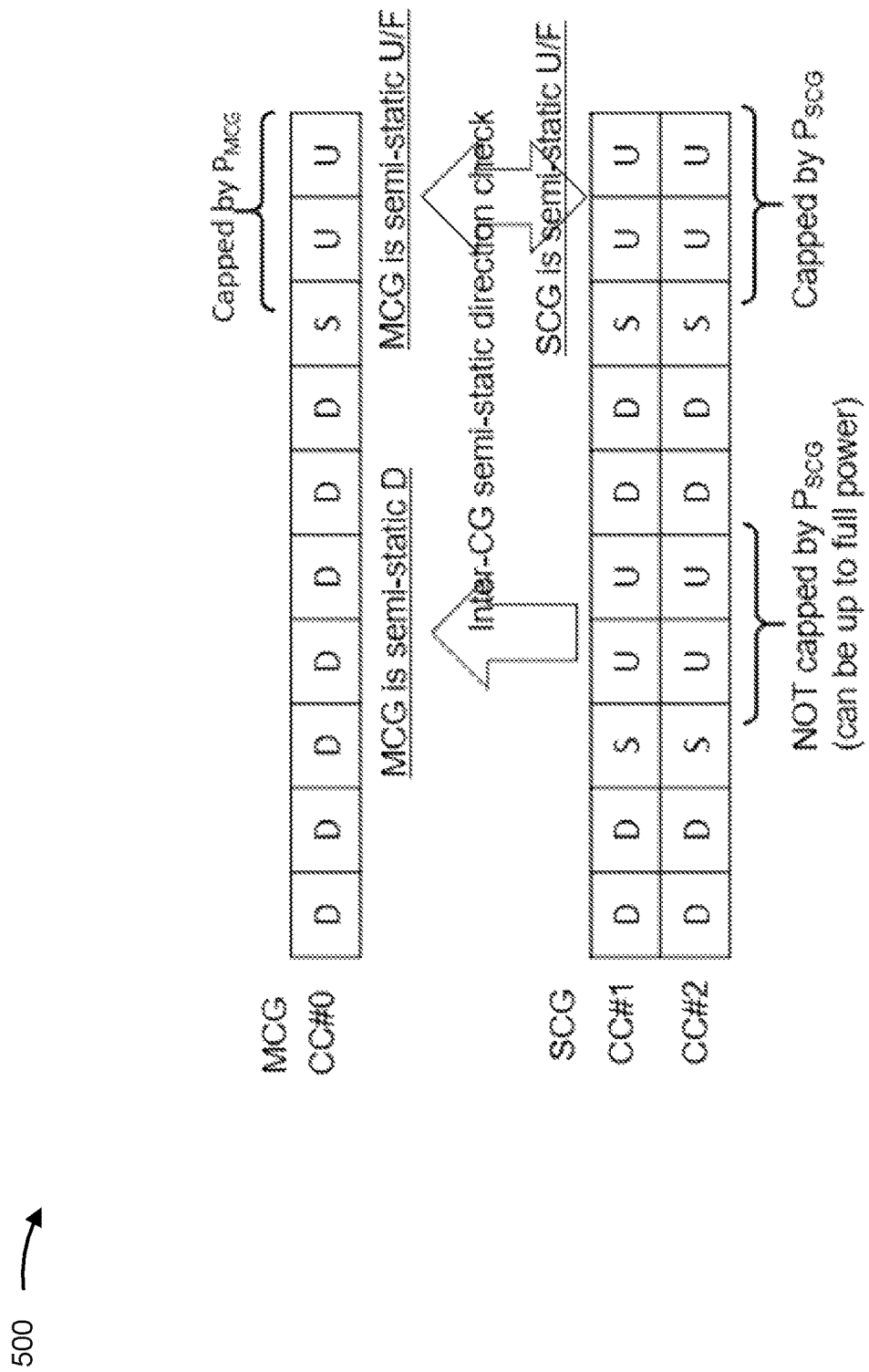
FIG. 5 is a diagram illustrating an example of Mode 2 power control, in accordance with the present disclosure.

FIG. 5 is a diagram illustrating an example 500 of Mode 2 power control, in accordance with the present disclosure.

In Mode 2, there may be a semi-static direction check across cell groups. The directions may be uplink or downlink. Mode 2 may be supported only for synchronous NRDC and may be in addition to Mode 1. As shown by example 500, the MCG may include slots that are semi-static downlink (D) slots. There may be a special (S) slots and uplink (U) slots with a transmit power that is capped by PMCG. The SCG may include slots for multiple carriers. The first U slots that occur while the MCG has D slots may not be capped by $P_{SCG}$, but the later U slots that align with U slots of the MCG may be capped by $P_{SCG}$.

As indicated above, FIG. 5 is provided as an example. Other examples may differ from what is described with respect to FIG. 5.

Figure 6:
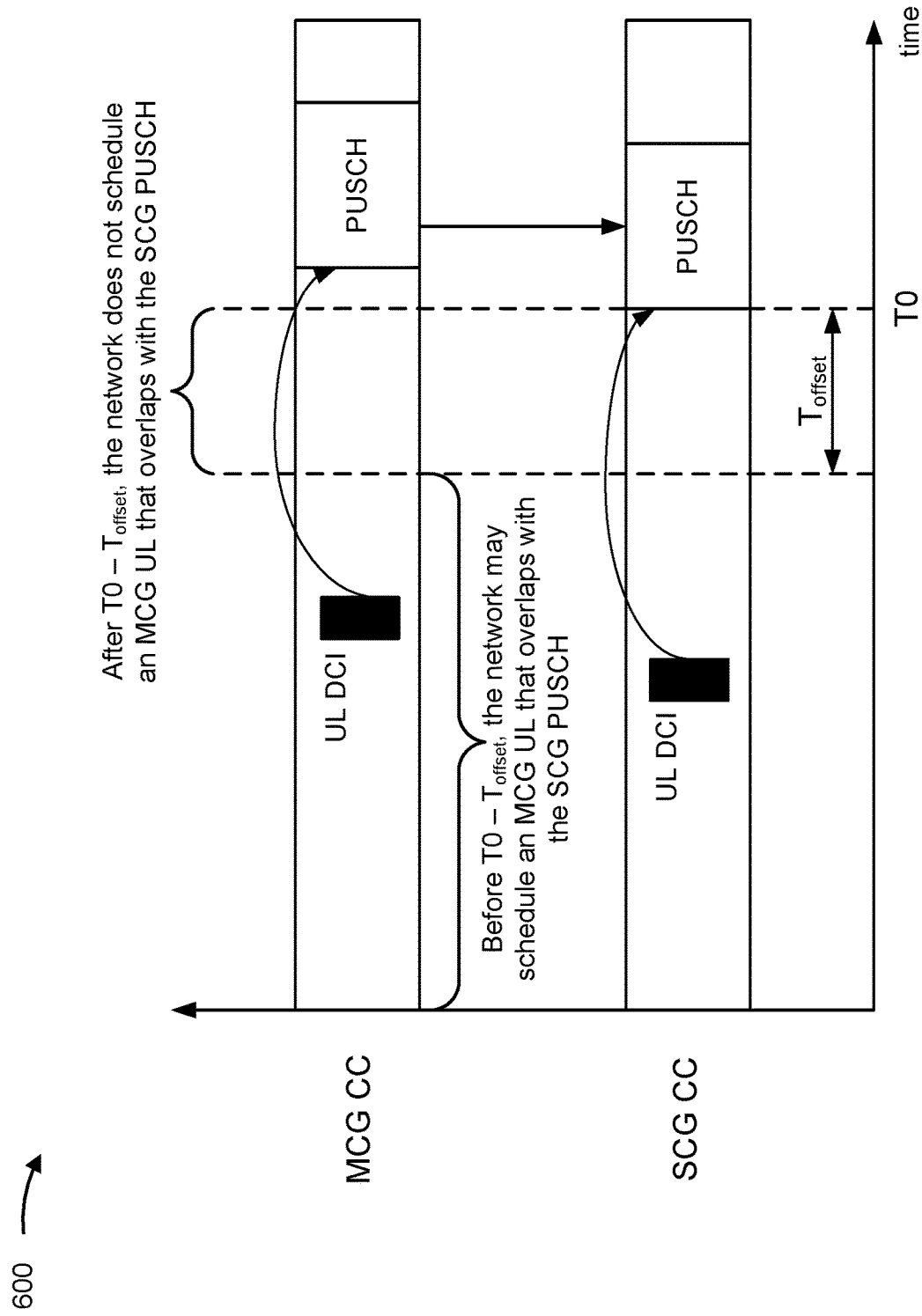
FIG. 6 is a diagram illustrating an example of power control, in accordance with the present disclosure.

FIG. 6 is a diagram illustrating an example 600 of power control, in accordance with the present disclosure. Example 600 shows DCI and an uplink transmission on an MCG component carrier (CC) and an SCG CC.

A UE may split the UE's transmit power between carriers on the MCG and carriers on the SCG based on DCIs. For an MCG uplink (UL) transmission, the SCG transmission does not impact the MCG uplink power control. The MCG transmit power may be the minimum of either the sum transmit power allocated for the MCG or the maximum power $P_{MCG}$. For an SCG uplink transmission, the maximum sum transmit power allocated for the SCG may be the minimum of either the maximum power $P_{SCG}$ or ($P_{total}$–MCG transmit power). The MCG transmit power may be calculated based on the MCG DCIs until T0–$T_{offset}$. T0 may be a time when scheduled transmissions are started on carriers of the SCG. $T_{offset}$ before T0 may be a time when an allocated power for carriers of the MCG is determined. After time T0–$T_{offset}$, the network may not schedule an MCG uplink transmission that overlaps with transmission on the SCG starting at time T0.

Inter-cell group sum power exchange may be in one direction (MCG to SCG). For an SCG uplink transmission, the maximum power is not impacted after the deadline (T0–$T_{offset}$). There is no need to update the SCG maximum power during the middle of the SCG uplink transmission. In each cell group, an uplink carrier aggregation (UL-CA) prioritization rule may be reused. A rationale for this approach is to not introduce phase discontinuity (different phases among adjacent transmissions) and that a consequence of one scheduler's decision should not be dependent on a decision made by another uncoordinated scheduler.

NRDC power control solutions can also be applied to 5G and 6G dual connectivity, including both semi-static and dynamic solutions. The semi-static solutions may be used so as not to rely on dynamic information exchanged in real time between the two RATs and also to not require a fast exchange of information on the UE side. This is based on the assumption that the schedulers cannot be coordinated in real-time and thus the burden should not be on the UE to operate as an arbitrator by performing dynamic power control. $P_{SCG}$ and $P_{SCG}$ may be set differently based on slot type and based on whether subband frequency duplexing (SBFD) or inter-band frequency duplexing (IBFD) is configured. The main drawback of the dynamic power control design is that the design negatively impacts the scheduling of latency-sensitive packets. This is due to introducing $T_{offset}$. As shown by example 600, $T_{offset}$ gives the UE time to determine an uplink transmit power for an uplink transmission (e.g., a physical uplink shared channel (PUSCH) communication, physical uplink control channel (PUCCH) communication) after a DCI for the other cell group. However, $T_{offset}$ introduces additional latency for ultra-reliable low latency communication (URLLC) packets on the MCG. Such latency may degrade communications and waste processing resources and signaling resources.

As indicated above, FIG. 6 is provided as an example. Other examples may differ from what is described with regard to FIG. 6.

Figure 7:
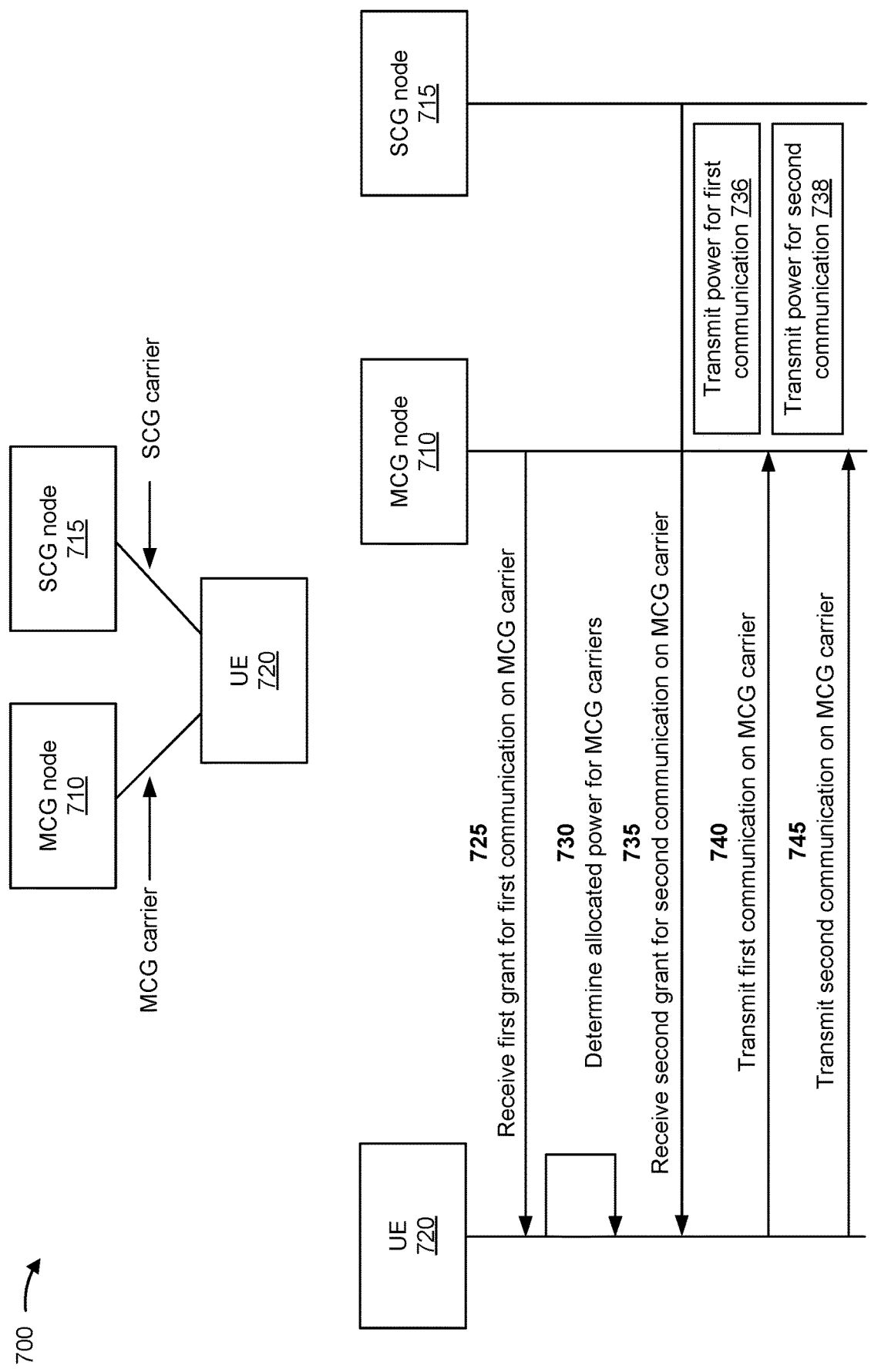
FIG. 7 is a diagram illustrating an example of dual connectivity transmit power control, in accordance with the present disclosure.

FIG. 7 is a diagram illustrating an example 700 of dual connectivity transmit power control, in accordance with the present disclosure. As shown in FIG. 7, an MCG node 710 (e.g., a network entity, a TRP) and an SCG node 715 (e.g., a network entity, a TRP) may communicate with a UE 720 (e.g., a UE 120) that uses dual connectivity (DC) (e.g., NN-DC), or inter-RAT multi-connectivity (e.g., 5G-6G multi-RAT connectivity). The DC may be inter-band DC (using different frequency bands) or intra-band DC (using the same frequency band).

For inter-band DC, late DCIs for PUSCH grants on the MCG may be allowed and this may distort phase continuity. Phase continuity may be maintained if two radio frequency (RF) chains are used. However, phase continuity may not be maintained if the same RF chain of the UE 720 is shared by the MCG and the SCG.

According to various aspects described herein, phase continuity of transmissions on the SCG may be maintained if a late DCI is received for the MCG, by the UE 720 recycling power from MCG transmissions or carriers rather than changing a power allocated to carriers of the SCG. The DCI may be late if the DCI is received within $T_{offset}$ or after T0−$T_{offset}$. The DCI may be late but acceptable if the DCI is for high priority data, or for data with a priority that satisfies a priority threshold (e.g., high priority level). For example, a transmit power for a first communication on a first MCG carrier may be based at least in part on a reserved power of the MCG and a transmit power of a second MCG carrier of the MCG. The reserved power may be per CG. A reserved power of the MCG may be what remains after a maximum transmit power configured for the SCG is subtracted from the total maximum transmit power for the UE 720. Likewise, a reserved power of the SCG may be what remains after a maximum transmit power configured for the MCG is subtracted from the total maximum transmit power for the UE 720. The late DCI, or transmissions in general, may recycle power from within the same cell group. For example, if all transmit power of the MCG is given to a transmission on a second carrier of the MCG, and the late DCI transmission is scheduled on the first carrier of the MCG, the UE 720 only recycles (reallocates) power for the first carrier transmission of the MCG from the second carrier transmission of the MCG, without recycling power from the SCG. CA-like power control may also be used across MCG carriers if and when the UE 720 becomes power limited. With this approach, the transmit power of the SCG remains unchanged. That is, the transmit power may be fixed to the transmit power decided by the deadline and not impacted by the late DCIs.

Example 700 shows a determination of transmit powers for the UE 720. The UE 720 may communicate with the MCG node 710 on one or more MCG carriers and communicate with the SCG node 715 on one or more SCG carriers. As shown by reference number 725, the UE 720 may receive a first grant (e.g., DCI indicating a resource grant on the MCG) for a first communication on a first MCG carrier that is in DC with an SCG carrier. In some aspects, the first MCG carrier and the SCG carrier may share the same RF chain of the UE 720.

As shown by reference number 730, the UE 720 may determine an allocated power for carriers of the MCG. This determination may be made by a specified time offset ($T_{offset}$) before a start (T0) of transmissions on carriers of the SCG. The time by which the allocated power is determined may be represented by T0−$T_{offset}$.

As shown by reference number 735, the UE 720 may receive a second grant (e.g., DCI indicating another resource grant on the MCG) for a second communication on an MCG carrier. If the second grant is late (after T0−$T_{offset}$), the determined transmit power for carriers on the MCG may remain the same. The second communication may be allocated power by recycling power from the maximum power of the MCG and the transmit power allocated to other overlapping transmissions across carriers belonging to the MCG. That is, a second transmit power 738 for the second communication may be based at least in part on the allocated power for the MCG carriers and a first transmit power 736 for the first communication and/or the maximum transmit power for the MCG.

As shown by reference number 740, the UE 720 may transmit the first communication on a first MCG carrier with the first transmit power 736. As shown by reference number 745, the UE 720 may transmit the second communication on a second MCG carrier with the second transmit power 738. With this approach, the transmit power of the SCG remains unchanged. That is, the transmit power of the SCG may remain fixed to the allocated power determined by the T0−$T_{offset}$ deadline and may not be impacted by the late grants. As a result, latency is not increased, communications are not degraded, and processing resources and signaling resources are conserved.

If intra-band DC uses different RF chains across the two groups, such a scenario is similar to inter-band DC. If intra-band DC uses the same RF chain across the two cell groups, phase discontinuity may be an issue. The UE 720 may fall back to not allowing the late DCIs on the MCG, as is done in NRDC. However, in some aspects, the UE 720 may make an exception for some late DCIs (e.g., the high priority grants) and allow the late DCIs to introduce phase discontinuity. This might be acceptable if the high priority transport blocks are bursty and sporadic.

As indicated above, FIG. 7 is provided as an example. Other examples may differ from what is described with respect to FIG. 7.

Figure 8:
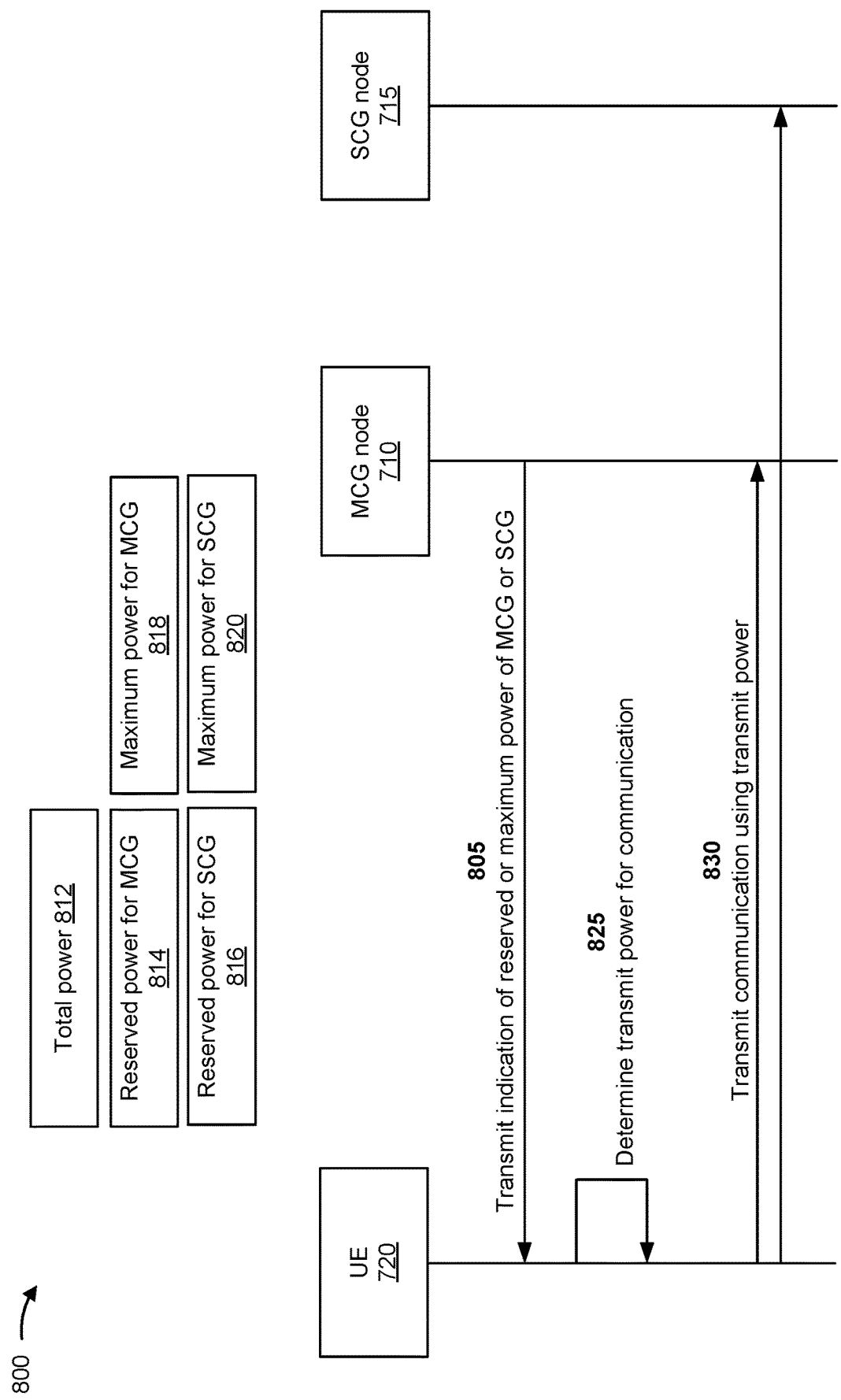
FIG. 8 is a diagram illustrating an example of dual connectivity transmit power control, in accordance with the present disclosure.

FIG. 8 is a diagram illustrating an example 800 of dual connectivity transmit power control, in accordance with the present disclosure.

For 6G carriers in scenarios with 5G and 6G DC, there may be stringent latency and reliability requirements for communications served on the SCG. With $P_{MCG}$ being the maximum power of the MCG, the UE 720 may determine the reserved power of the SCG if $P_{MCG}$ is set to a smaller transmit power value than total power $P_{total}$. Therefore, some power may be reserved for high priority packets on the SCG, regardless of the power required for uplink transmissions on the MCG. However, it has not been specified how the UE 720 is to set an amount of reserved power for the MCG or an amount of reserved power for the SCG. If a reserved power is set too high, the power may be wasted because high priority traffic can be bursty and sporadic. If a reserved power is too low, the power may not be sufficient, which increases latency and reduces reliability. High priority transmissions, including for URLLC, may be efficient in the absence of knowledge about the uplink transmissions and the required power on the other cell group. The amount of reserved power can be changed semi-statically. However, RRC latency can be more than 20 milliseconds (ms). This latency may be too long to react to URLLC scheduling needs.

According to various aspects described herein, the reserved powers or maximum allowed power per CG for the MCG and the SCG may be updated at a faster rate than the existing RRC updates. As shown by reference number 805, a network entity (e.g., base station 110) may transmit an indication, via DCI or a MAC CE, of a reserved power of an MCG 814, a reserved power of an SCG 816, a maximum power of the MCG 818, and/or a maximum power of the SCG 820. As shown by reference number 825, the UE 720 may determine the transmit power for a communication based at least in part on the indication. The UE 720 may determine the transmit power by determining the reserved power of the MCG 814 from an indication of the maximum power of the SCG 820 or by determining the reserved power of the SCG 816 from an indication of the maximum power of the MCG 818. This is because the total power 812 of the UE 720 may also be known. For example, the UE 720 may subtract an indicated maximum power of the SCG 816 from the total power 812 to obtain the reserved power of the MCG 814. Alternatively, or additionally, the UE 720 may subtract an indicated maximum power of the MCG 818 from the total power 812 to obtain the reserved power of the SCG 816.

As shown by reference number 830, the UE 720 may transmit a communication with a transmit power that is based at least in part on the indication. In some aspects, the UE 720 may transmit a buffer status report (BSR) that indicates whether there is any data from logical channels with a high priority. The network entity (e.g., MCG node 710 and/or SCG node 715) may determine an offset for the reserved powers per cell group and signal the offset to the UE 720 via DCI or a MAC CE. The indication may indicate an action time for using the reserved power that is indicated.

For example, the UE 720 may transmit a BSR and require grants for URLLC transmission on the SCG. If a reserved power Pres SCG for the SCG is 0, due to this request and the SCG scheduler not knowing scheduling decisions by the MCG, the UE 720 may determine to set the reserved power of the SCG to a non-zero value. This information may be exchanged across the MCG and SCG schedulers (and agreed upon). DCI may be used to indicate, to the UE 720, the change in the reserved power for the SCG. This indication is then used by the UE 720 to determine the power of the MCG. The UE 720 may determine the MCG transmit power based at least in part on the reserved power for the SCG (e.g., $P_{res\ SCG}$), which may be the power that remains for the SCG.

As indicated above, FIG. 8 is provided as an example. Other examples may differ from what is described with respect to FIG. 8.

Figure 9:
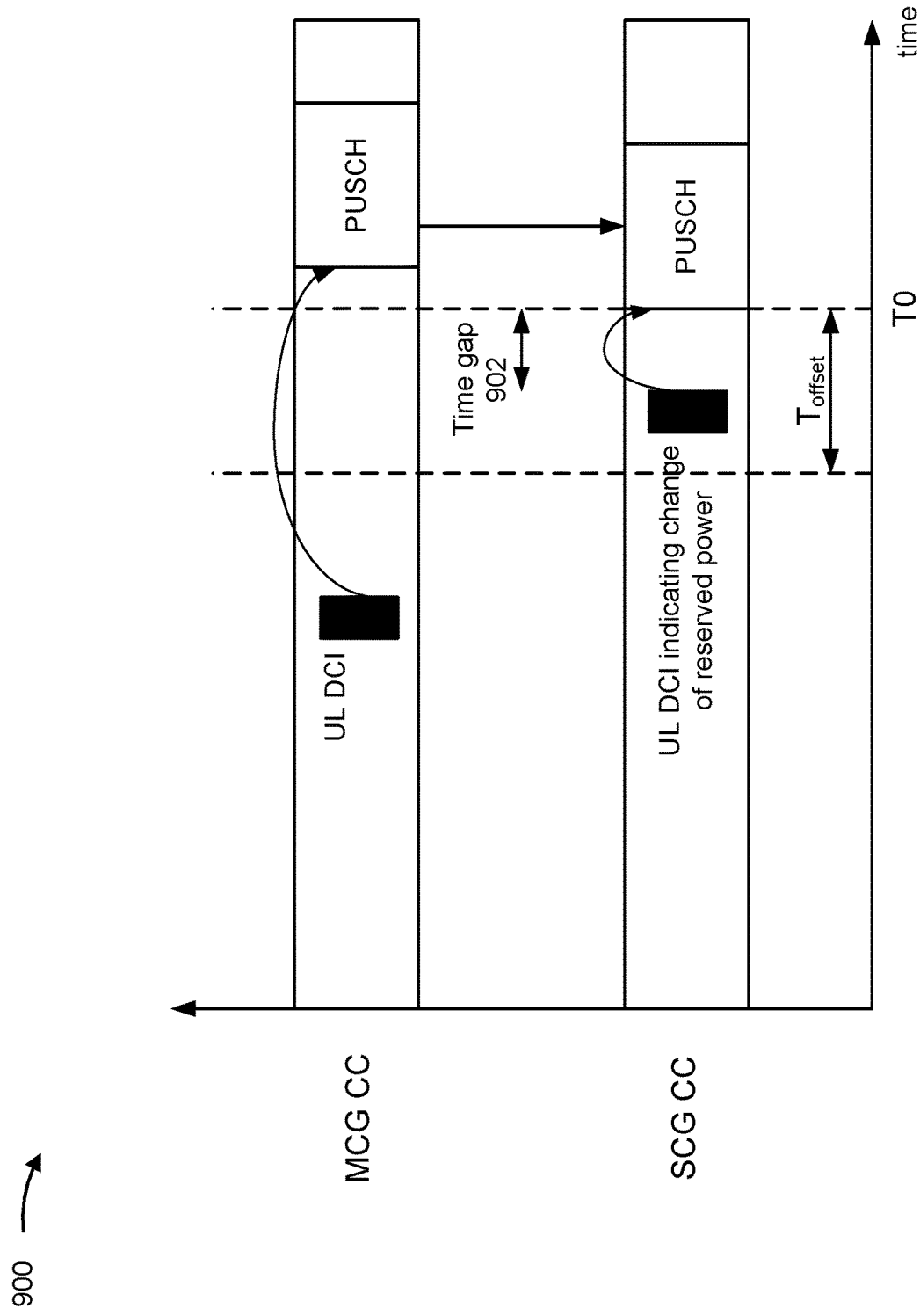
FIG. 9 is a diagram illustrating an example of a time gap for cell groups, in accordance with the present disclosure.

FIG. 9 is a diagram illustrating an example 900 of a time gap for cell groups, in accordance with the present disclosure.

Example 900 shows DCI that indicates a change of reserved power for SCG and that schedules an uplink transmission on the SCG that overlaps with an uplink transmission on the MCG. In this scenario, the MCG scheduler has scheduled the uplink transmission assuming a certain transmit power. If the later DCI (grant) indicates a change in this assumption without leaving sufficient time, the MCG performance is impacted.

In some aspects, the UE 720 may be configured with sufficient time to control a transmit power for a transmission. For example, the UE 720 may receive time gap information that indicates a time gap 902 between a time that the indication is received and an action time (e.g., time for transmission, time for applying power control). The time gap 902 may be in symbols and/or slots. Using the time gap 902 may be quicker than changing a minimum power via RRC configuration, even if the reserved power is not sufficient for the first transmission on the SCG. In addition, when the burst of packets has been transmitted, the UE 720 may reduce the reserved power so that the power can be recycled by the other cell group when needed, rather than being wasted. The time gap 902 may be associated with a validity time and the time gap 902 may expire after the validity time. Alternatively, the time gap 902 may be assumed valid until overridden.

In some aspects, the UE 720 may receive the time gap information via DCI that schedules an uplink transmission on a cell group or via a specific power control DCI. The time gap information may be received on any of the MCG or the SCG, or on both the MCG and the SCG. The time gap information may be received on the impacted cell group, or the cell group that is to change its maximum configured power. By using the time gap 902, the UE 720 may be able to maintain phase continuity and control the transmit power for late arriving DCI.

The UE 720 may use semi-static uplink resources (e.g., configured grant PUSCH resources). The UE 720 may determine whether these resources are used or not. When the UE 720 has data from a logical channel that can be mapped to a given uplink resource, the UE 720 may perform transmission. Otherwise, the UE 720 may not use these resources. The reserved power of a cell group, or the maximum power of another cell group, may be based at least in part on whether a transmission occasion for a communication on a carrier of the MCG overlaps with a configured grant occasion on a carrier of the SCG. For example, if a PUSCH communication on the MCG is not overlapping with a configured grant occasion on the SCG, the UE 720 may determine the transmit power to be $P_{MCG1}$. If the PUSCH communication does overlap with the configured grant occasion on the SCG, the UE 720 may determine that $P_{MCG2} < P_{MCG1}$. This may leave more power for SCG transmissions on the configured resources. The configured grant occasion may be for a configured grant for a PUSCH or for a configured grant for a scheduling request.

In some aspects, the network entity may update or modify the maximum power or the reserved power of a CG transmit by transmitting update information of a positive or negative power offset or time offset in a configuration for the CG. The network entity may indicate a power offset (e.g., a positive or negative change in a reserved power for a cell group) separately for different configured grant uplink transmission configurations or based at least in part on a priority of a configured grant uplink transmission configuration. For example, the UE 720 may apply the power offset only for transmissions that are indicated as high priority. The network entity may indicate the power offsets semi-statically (e.g., via an RRC message) and then update the power offsets dynamically via DCI or a MAC CE.

While FIGS. 6-8 describe actions for an MCG with respect to an SCG, the aspects described herein may be applicable to actions for an SCG with respect to an MCG. More generally, the MCG may be a first cell group and the SCG may be a second cell group, or the SCG may be a first cell group and the MCG may be a second cell group. The aspects described herein may apply to a first cell group with respect to a second cell group.

As indicated above, FIG. 9 is provided as an example. Other examples may differ from what is described with regard to FIG. 9.

Figure 10:
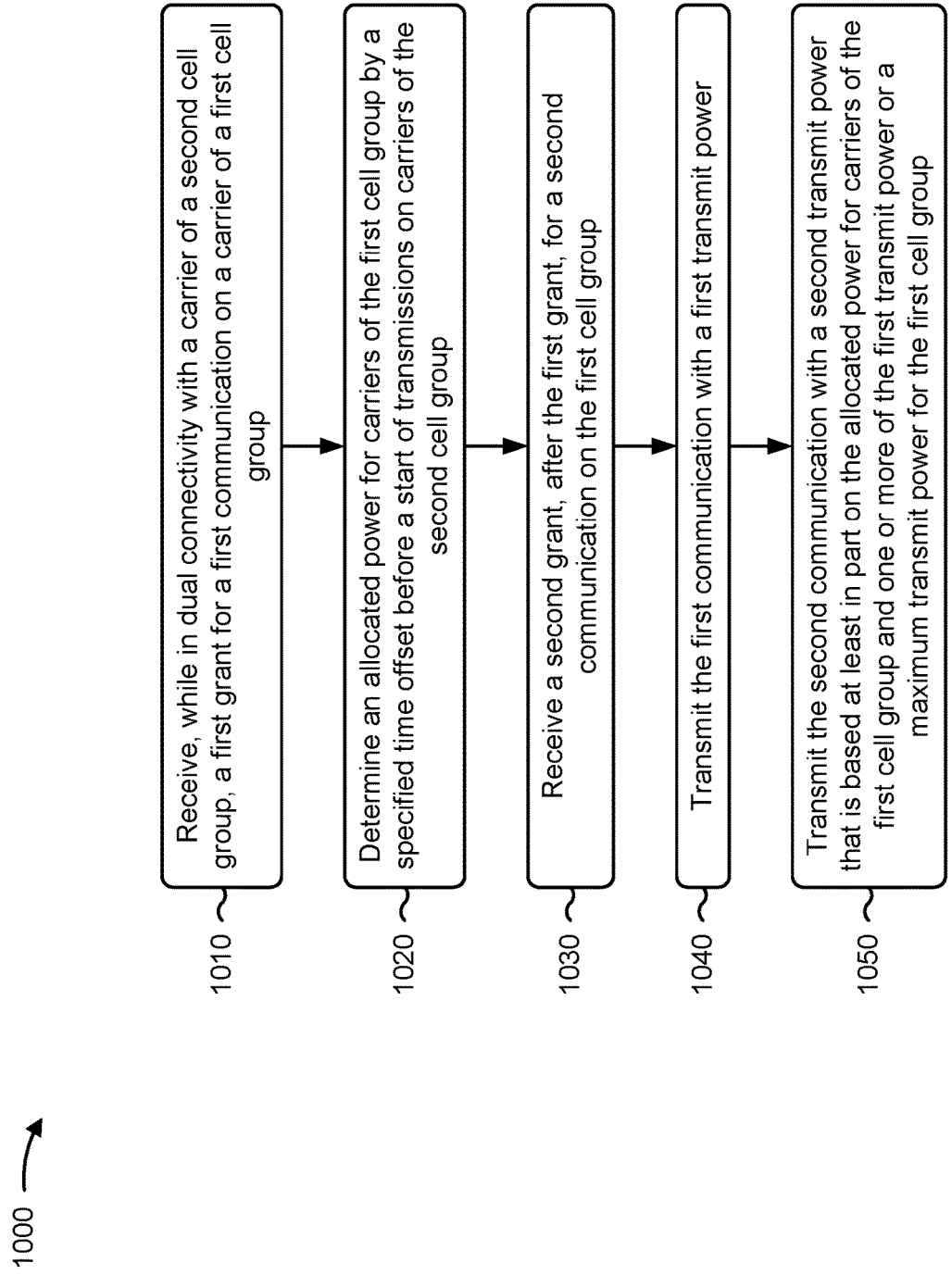
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., a UE 120, UE 720) performs operations associated with dual connectivity power control.

As shown in FIG. 10, in some aspects, process 1000 may include receiving, while in dual connectivity with a carrier of a second cell group, a first grant for a first communication on a carrier of a first cell group (block 1010). For example, the UE (e.g., using communication manager 1308 and/or reception component 1302 depicted in FIG. 13) may receive, while in dual connectivity with a carrier of a second cell group, a first grant for a first communication on a carrier of a first cell group, as described above. The first cell group may be an MCG and the second cell group may be an SCG. Alternatively, the first cell group may be an SCG and the second cell group may be an MCG.

As further shown in FIG. 10, in some aspects, process 1000 may include determining an allocated power for carriers of the first cell group by a specified time offset before a start of transmissions on carriers of the second cell group (block 1020). For example, the UE (e.g., using communication manager 1308 and/or power component 1310 depicted in FIG. 13) may determine an allocated power for carriers of the first cell group by a specified time offset before a start of transmissions on carriers of the second cell group, as described above.

As further shown in FIG. 10, in some aspects, process 1000 may include receiving a second grant, after the first grant, for a second communication on the first cell group (block 1030). For example, the UE (e.g., using communication manager 1308 and/or reception component 1302 depicted in FIG. 13) may receive a second grant, after the first grant, for a second communication on the first cell group, as described above.

As further shown in FIG. 10, in some aspects, process 1000 may include transmitting the first communication with a first transmit power (block 1040). For example, the UE (e.g., using communication manager 1308 and/or transmission component 1304 depicted in FIG. 13) may transmit the first communication with a first transmit power, as described above.

As further shown in FIG. 10, in some aspects, process 1000 may include transmitting the second communication with a second transmit power that is based at least in part on the allocated power for carriers of the first cell group and one or more of the first transmit power or a maximum transmit power for the first cell group (block 1050). For example, the UE (e.g., using communication manager 1308 and/or transmission component 1304 depicted in FIG. 13) may transmit the second communication with a second transmit power that is based at least in part on the allocated power for carriers of the first cell group and one or more of the first transmit power or a maximum transmit power for the first cell group, as described above.

Process 1000 may include additional aspects, such as any single aspect or any combination of aspects described below and/or in connection with one or more other processes described elsewhere herein.

In a first aspect, the dual connectivity is inter-band dual connectivity.

In a second aspect, alone or in combination with the first aspect, the dual connectivity is intra-band dual connectivity.

In a third aspect, alone or in combination with one or more of the first and second aspects, the carrier of the first cell group and the carrier of the second cell group share a same RF chain of the UE.

In a fourth aspect, alone or in combination with one or more of the first through third aspects, receiving the second grant includes receiving the second grant after the specified time offset before the start of transmissions on carriers of the second cell group.

In a fifth aspect, alone or in combination with one or more of the first through fourth aspects, the second transmit power does not change the power allocated to carriers of the second cell group.

In a sixth aspect, alone or in combination with one or more of the first through fifth aspects, a priority of the first grant satisfies a priority threshold.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
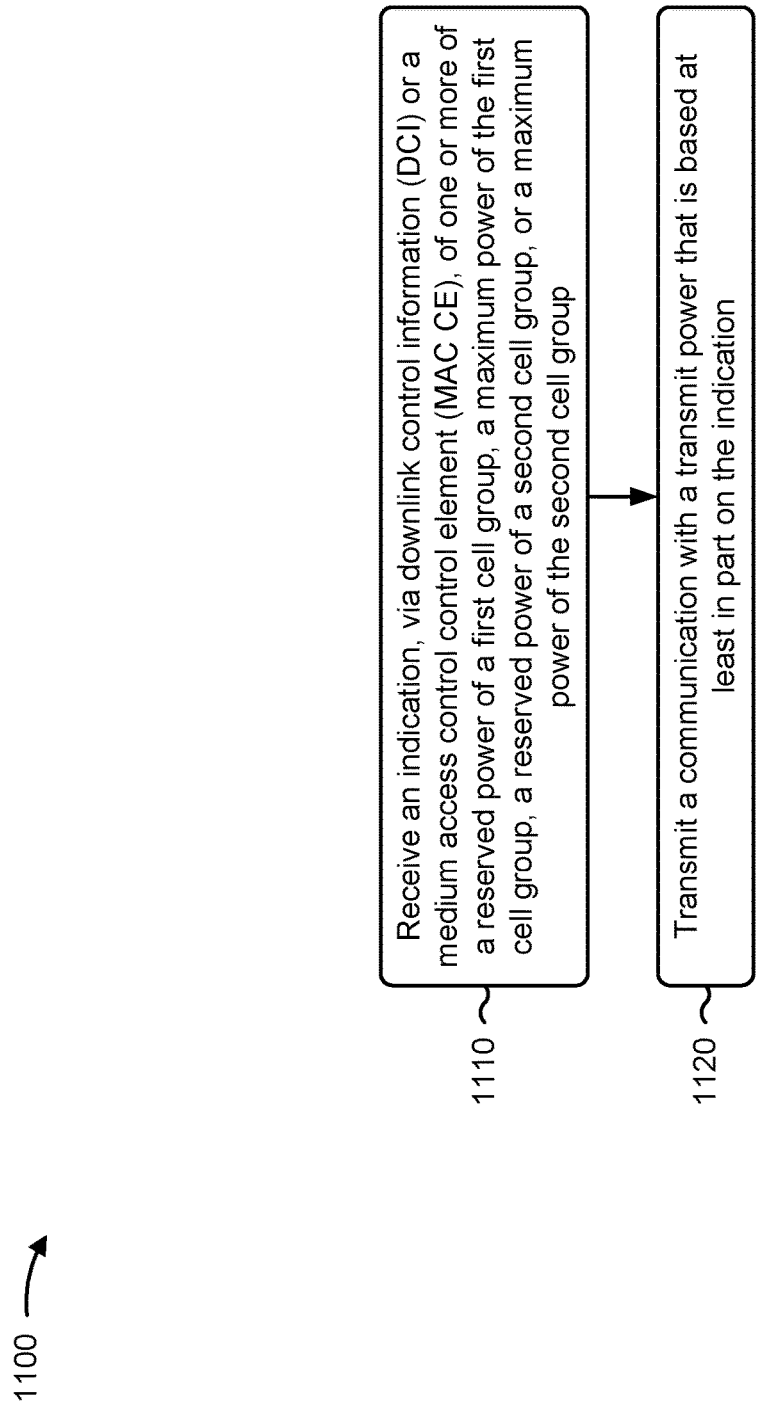
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., a UE 120, UE 720) performs operations associated with dual connectivity power control.

As shown in FIG. 11, in some aspects, process 1100 may include receiving an indication, via DCI or a MAC CE, of one or more of a reserved power of a first cell group, a maximum power of the first cell group, a reserved power of a second cell group, or a maximum power of the second cell group (block 1110). For example, the UE (e.g., using communication manager 1308 and/or reception component 1302 depicted in FIG. 13) may receive an indication, via DCI or a MAC CE, of one or more of a reserved power of a first cell group, a maximum power of the first cell group, a reserved power of a second cell group, or a maximum power of the second cell group, as described above. The first cell group may be an MCG and the second cell group may be an SCG. Alternatively, the first cell group may be an SCG and the second cell group may be an MCG.

As further shown in FIG. 11, in some aspects, process 1100 may include transmitting a communication with a transmit power that is based at least in part on the indication (block 1120). For example, the UE (e.g., using communication manager 140 and/or transmission component 1304 depicted in FIG. 13) may transmit a communication with a transmit power that is based at least in part on the indication, as described above.

Process 1100 may include additional aspects, such as any single aspect or any combination of aspects described below and/or in connection with one or more other processes described elsewhere herein.

In a first aspect, the indication is a maximum power of the first cell group, the communication is for the second cell group, and the transmit power is based at least in part on a reserved power of the second cell group, and process 1100 includes determining the reserved power of the second group from the maximum power of the first cell group and a total transmit power configured for the UE.

In a second aspect, alone or in combination with the first aspect, process 1100 includes receiving time gap information that indicates a time gap between receiving the indication and modifying the reserved power of the first cell group, the reserved power of the second cell group, the maximum power of the first cell group, or the maximum power of the second cell group.

In a third aspect, alone or in combination with one or more of the first and second aspects, the time gap information indicates the time gap in one or more of symbols or slots.

In a fourth aspect, alone or in combination with one or more of the first through third aspects, receiving the time gap information includes receiving the time gap information in one or more of a cell group that is impacted by the time gap information or another cell group.

In a fifth aspect, alone or in combination with one or more of the first through fourth aspects, process 1100 includes receiving update information that updates of one or more of a maximum power, a reserved power, or a power offset for the first cell group or the second cell group.

In a sixth aspect, alone or in combination with one or more of the first through fifth aspects, a reserved power for the first cell group is based at least in part on whether a transmission occasion for the communication, being on a carrier of the first cell group, overlaps with a configured grant occasion on a carrier of the second cell group.

In a seventh aspect, alone or in combination with one or more of the first through sixth aspects, the configured grant occasion is for a configured grant for a physical uplink shared channel or for a configured grant for a scheduling request.

In an eighth aspect, alone or in combination with one or more of the first through seventh aspects, process 1100 includes receiving update information that updates a power offset for the reserved power of the first cell group or for the reserved power of the second cell group separately for each configured grant uplink transmission configuration.

In a ninth aspect, alone or in combination with one or more of the first through eighth aspects, process 1100 includes receiving update information that updates a power offset, for the reserved power of the first cell group or for the reserved power of the second cell group, based at least in part on a priority of a configured grant uplink transmission configuration.

In a tenth aspect, alone or in combination with one or more of the first through ninth aspects, process 1100 includes receiving power offset information, via an RRC message, that sets a power offset for the reserved power of the first cell group or for the reserved power of the second cell group, and receiving an update of the power offset via DCI or a MAC CE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
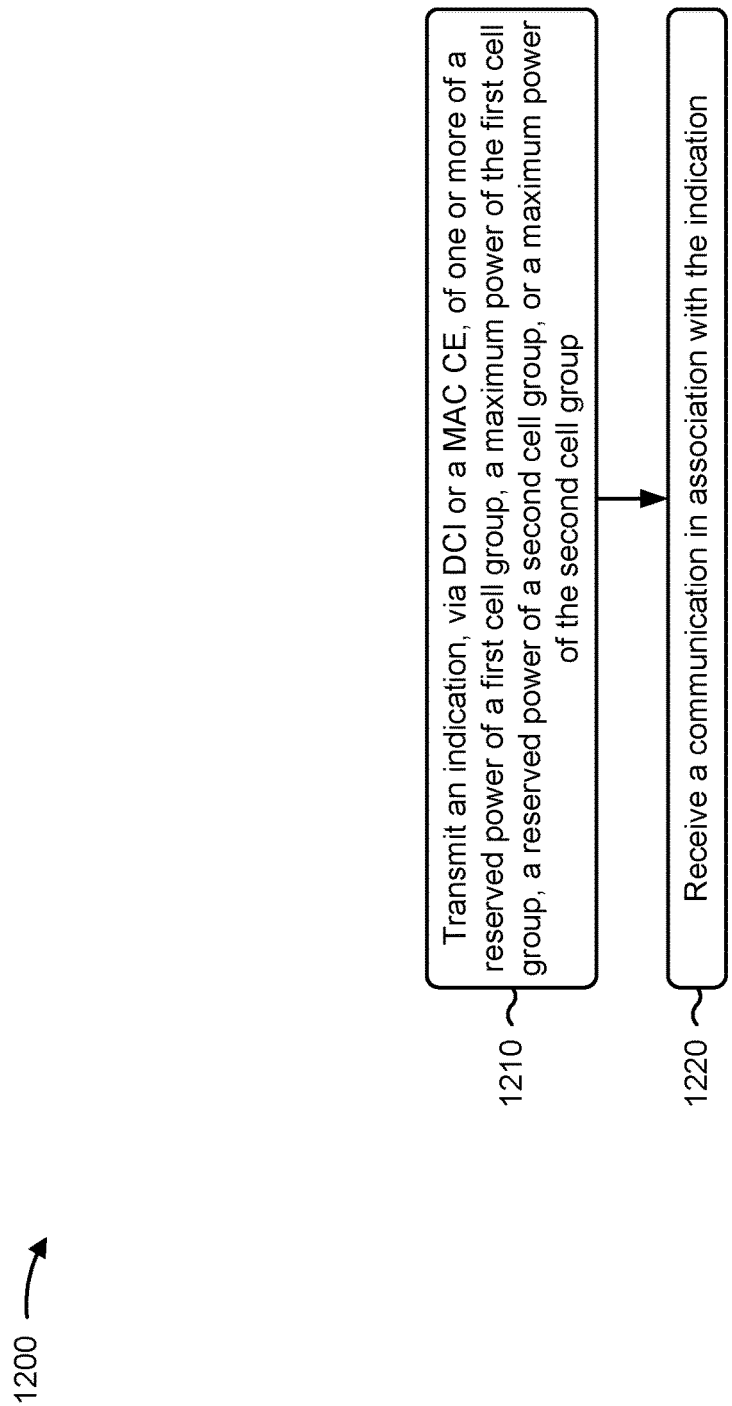
FIG. 12 is a diagram illustrating an example process performed, for example, by a network entity, in accordance with the present disclosure.

FIG. 12 is a diagram illustrating an example process 1200 performed, for example, by a network entity, in accordance with the present disclosure. Example process 1200 is an example where the network entity (e.g., base station 110, MCG node 710, SCG node 715) performs operations associated with dual connectivity power control.

As shown in FIG. 12, in some aspects, process 1200 may include transmitting an indication, via DCI or a MAC CE, of one or more of a reserved power of a first cell group, a maximum power of the first cell group, a reserved power of a second cell group, or a maximum power of the second cell group (block 1210). For example, the network entity (e.g., using communication manager 1408 and/or transmission component 1404 depicted in FIG. 14) may transmit an indication, via DCI or a MAC CE, of one or more of a reserved power of a first cell group, a maximum power of the first cell group, a reserved power of a second cell group, or a maximum power of the second cell group, as described above. The first cell group may be an MCG and the second cell group may be an SCG. Alternatively, the first cell group may be an SCG and the second cell group may be an MCG.

As further shown in FIG. 12, in some aspects, process 1200 may include receiving a communication in association with the indication (block 1220). For example, the network entity (e.g., using communication manager 1408 and/or reception component 1402 depicted in FIG. 14) may receive a communication in association with the indication, as described above.

Process 1200 may include additional aspects, such as any single aspect or any combination of aspects described below and/or in connection with one or more other processes described elsewhere herein.

In a first aspect, process 1200 includes transmitting time gap information that indicates a time gap between receiving the indication and modifying the reserved power of the first cell group, the reserved power of the second cell group, the maximum power of the first cell group, or the maximum power of the second cell group.

In a second aspect, alone or in combination with the first aspect, the time gap information indicates the time gap in one or more of symbols or slots.

In a third aspect, alone or in combination with one or more of the first and second aspects, transmitting the time gap information includes transmitting the time gap information in one or more of a cell group that is impacted by the time gap information or another cell group.

In a fourth aspect, alone or in combination with one or more of the first through third aspects, process 1200 includes transmitting update information that updates one or more of a maximum power, a reserved power, or a power offset for the first cell group or the second cell group.

In a fifth aspect, alone or in combination with one or more of the first through fourth aspects, the reserved power of the first cell group is based at least in part on whether a transmission occasion for the communication, being on a carrier of the first cell group, overlaps with a configured grant occasion on a carrier of the second cell group.

In a sixth aspect, alone or in combination with one or more of the first through fifth aspects, process 1200 includes transmitting update information that updates a power offset for the reserved power of the first cell group, or for the reserved power of the second cell group, separately for each configured grant uplink transmission configuration.

In a seventh aspect, alone or in combination with one or more of the first through sixth aspects, process 1200 includes transmitting update information that updates a power offset, for the reserved power of the first cell group or for the reserved power of the second cell group, based at least in part on a priority of a configured grant uplink transmission configuration.

In an eighth aspect, alone or in combination with one or more of the first through seventh aspects, process 1200 includes transmitting power offset information, via an RRC message, that sets a power offset for the reserved power of the first cell group or for the reserved power of the second cell group, and transmitting an update of the power offset via DCI or a MAC CE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
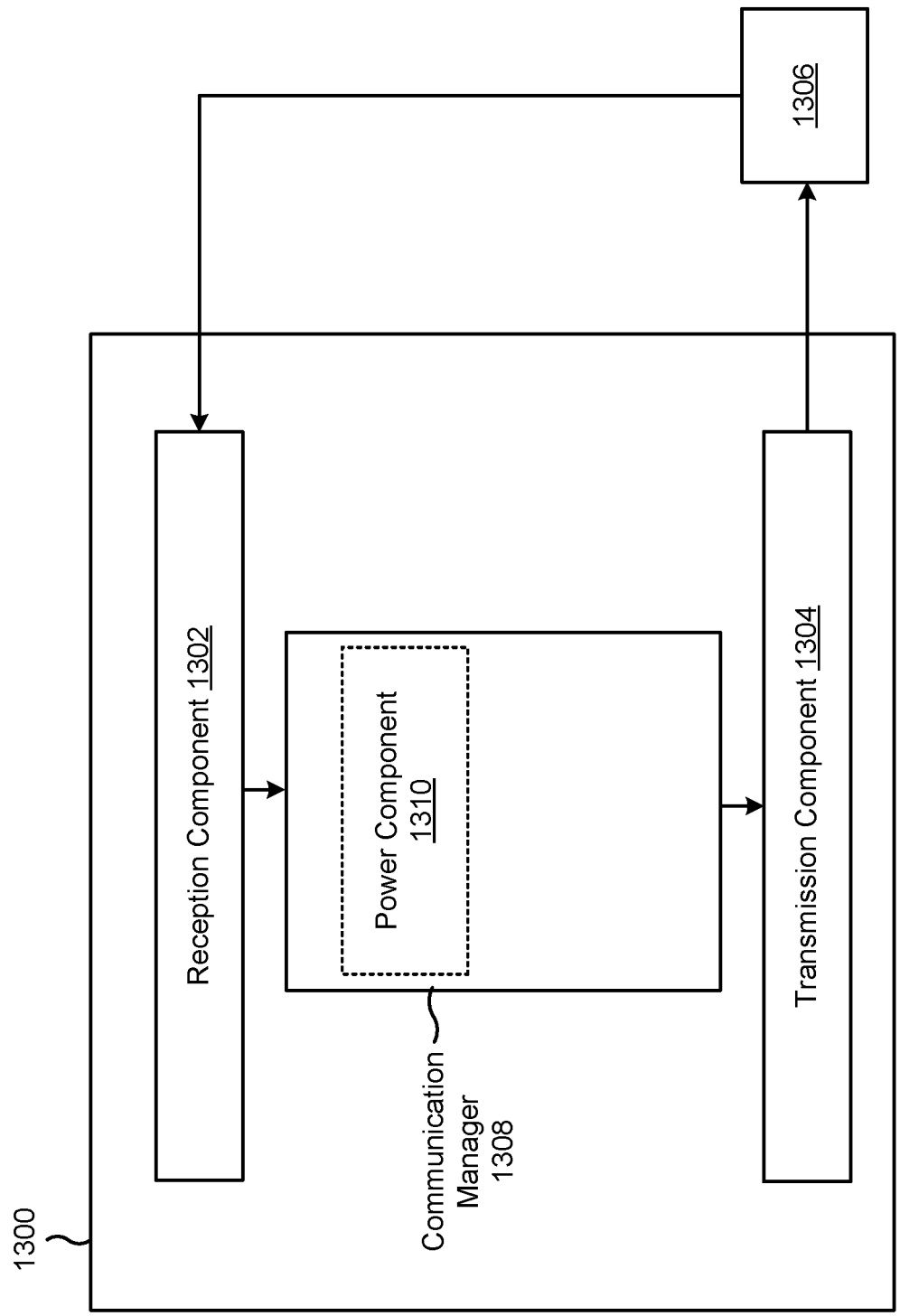
FIGS. 13-14 are diagrams of example apparatuses for wireless communication, in accordance with the present disclosure.

FIG. 13 is a diagram of an example apparatus 1300 for wireless communication, in accordance with the present disclosure. The apparatus 1300 may be a UE (e.g., a UE 120, UE 720), or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 1308. The communication manager 1308 may control and/or otherwise manage one or more operations of the reception component 1302 and/or the transmission component 1304. In some aspects, the communication manager 1308 may include one or more antennas, a modem, a controller/processor, a memory, or a combination thereof, of the UE described in connection with FIG. 2. The communication manager 1308 may be, or be similar to, the communication manager 140 depicted in FIGS. 1 and 2. For example, in some aspects, the communication manager 1308 may be configured to perform one or more of the functions described as being performed by the communication manager 140. In some aspects, the communication manager 1308 may include the reception component 1302 and/or the transmission component 1304. The communication manager 1308 may include a power component 1310, among other examples.

In some aspects, the apparatus 1300 may be configured to perform one or more operations described herein in connection with FIGS. 1-9. Additionally, or alternatively, the apparatus 1300 may be configured to perform one or more processes described herein, such as process 1000 of FIG. 10, process 1100 of FIG. 11, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

In some aspects, the reception component 1302 may receive, while in dual connectivity with a carrier of a second cell group, a first grant for a first communication on a carrier of a first cell group. The power component 1310 may determine an allocated power for carriers of the first cell group by a specified time offset before a start of transmissions on carriers of the second cell group. The reception component 1302 may receive a second grant, after the first grant, for a second communication on the first cell group. The transmission component 1304 may transmit the first communication with a first transmit power. The transmission component 1304 may transmit the second communication with a second transmit power that is based at least in part on the allocated power for carriers of the first cell group and one or more of the first transmit power or a maximum transmit power for the first cell group.

In some aspects, the reception component 1302 may receive an indication, via DCI or a MAC CE, of one or more of a reserved power of a first cell group, a maximum power of the first cell group, a reserved power of a second cell group, or a maximum power of the second cell group. The transmission component 1304 may transmit a communication with a transmit power that is based at least in part on the indication.

The reception component 1302 may receive time gap information that indicates a time gap between receiving the indication and modifying the reserved power of the first cell group, the reserved power of the second cell group, the maximum power of the first cell group, or the maximum power of the second cell group.

The reception component 1302 may receive update information that updates of one or more of a maximum power, a reserved power, or a power offset for the first cell group or the second cell group. The reception component 1302 may receive update information that updates a power offset for the reserved power of the first cell group or for the reserved power of the second cell group separately for each configured grant uplink transmission configuration. The reception component 1302 may receive update information that updates a power offset, for the reserved power of the first cell group or for the reserved power of the second cell group, based at least in part on a priority of a configured grant uplink transmission configuration.

The reception component 1302 may receive power offset information, via a radio resource control message, that sets a power offset for the reserved power of the first cell group or for the reserved power of the second cell group. The reception component 1302 may receive an update of the power offset via DCI or a MAC CE.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
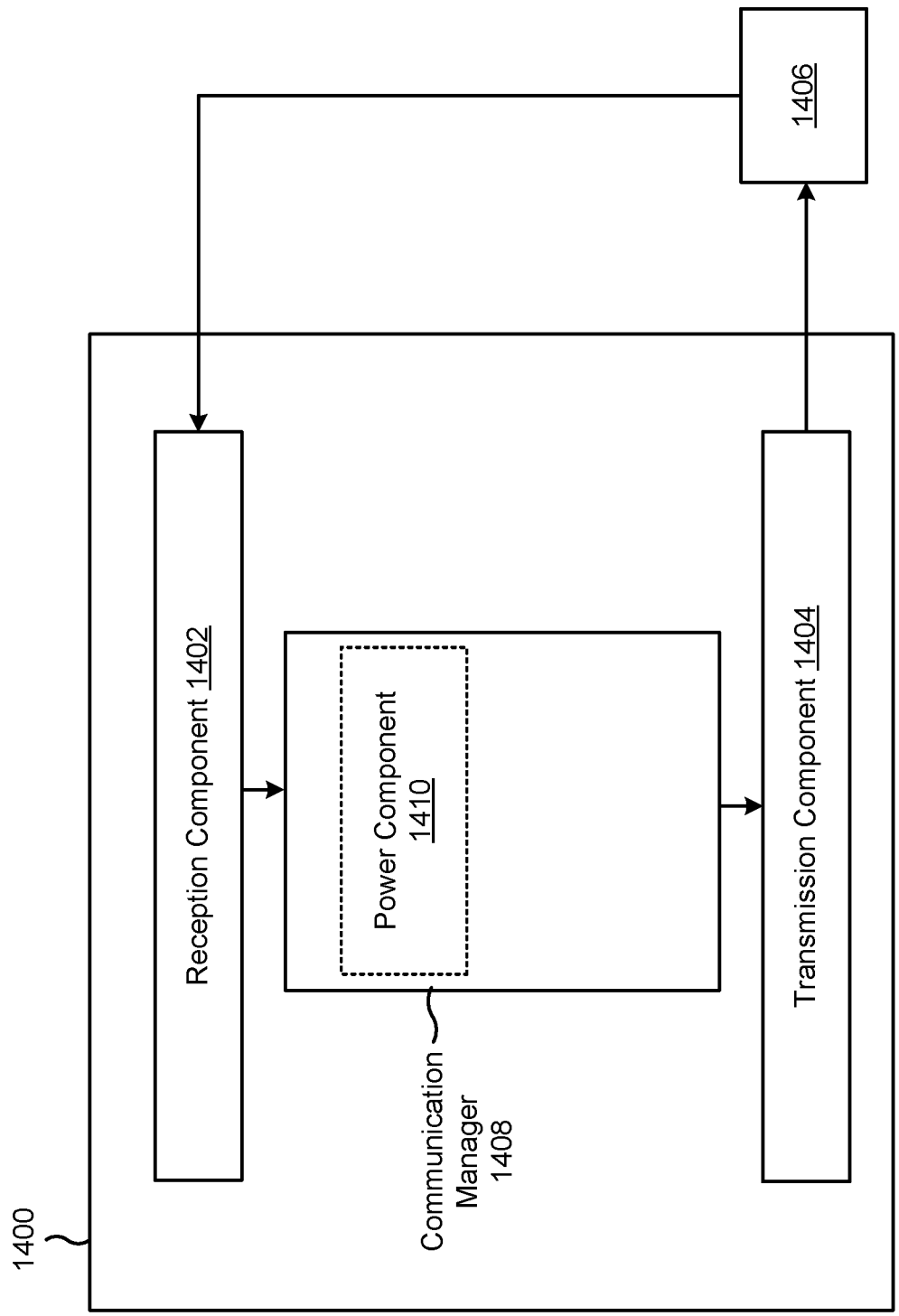

FIG. 14 is a diagram of an example apparatus 1400 for wireless communication, in accordance with the present disclosure. The apparatus 1400 may be a network entity (e.g., base station 110, MCG node 710, SCG node 715), or a network entity may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 1408. The communication manager 1408 may control and/or otherwise manage one or more operations of the reception component 1402 and/or the transmission component 1404. In some aspects, the communication manager 1408 may include one or more antennas, a modem, a controller/processor, a memory, or a combination thereof, of the network entity described in connection with FIG. 2. The communication manager 1408 may be, or be similar to, the communication manager 150 depicted in FIGS. 1 and 2. For example, in some aspects, the communication manager 1408 may be configured to perform one or more of the functions described as being performed by the communication manager 1408. In some aspects, the communication manager 1408 may include the reception component 1402 and/or the transmission component 1404. The communication manager 1408 may include a power component 1410, among other examples.

In some aspects, the apparatus 1400 may be configured to perform one or more operations described herein in connection with FIGS. 1-9. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the network entity described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network entity described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network entity described in connection with FIG. 2. In some aspects, the transmission component 1404 may be co-located with the reception component 1402 in a transceiver.

The transmission component 1404 may transmit an indication, via DCI or a MAC CE, of one or more of a reserved power of a first cell group, a maximum power of the first cell group, a reserved power of a second cell group, or a maximum power of the second cell group. The reception component 1402 may receive a communication in association with the indication.

The transmission component 1404 may transmit time gap information that indicates a time gap between receiving the indication and modifying the reserved power of the first cell group, the reserved power of the second cell group, the maximum power of the first cell group, or the maximum power of the second cell group.

The transmission component 1404 may transmit update information that updates one or more of a maximum power, a reserved power, or a power offset for the first cell group or the second cell group. The transmission component 1404 may transmit update information that updates a power offset for the reserved power of the first cell group, or for the reserved power of the second cell group, separately for each configured grant uplink transmission configuration. The transmission component 1404 may transmit update information that updates a power offset, for the reserved power of the first cell group or for the reserved power of the second cell group, based at least in part on a priority of a configured grant uplink transmission configuration.

The transmission component 1404 may transmit power offset information, via a radio resource control message, that sets a power offset for the reserved power of the first cell group or for the reserved power of the second cell group. The transmission component 1404 may transmit an update of the power offset via DCI or a MAC CE.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving, while in dual connectivity with a carrier of a second cell group, a first grant for a first communication on a carrier of a first cell group; determining an allocated power for carriers of the first cell group by a specified time offset before a start of transmissions on carriers of the second cell group; receiving a second grant, after the first grant, for a second communication on the first cell group; transmitting the first communication with a first transmit power; and transmitting the second communication with a second transmit power that is based at least in part on the allocated power for carriers of the first cell group and one or more of the first transmit power or a maximum transmit power for the first cell group.

Aspect 2: The method of Aspect 1, wherein the dual connectivity is inter-band dual connectivity.

Aspect 3: The method of Aspect 1, wherein the dual connectivity is intra-band dual connectivity.

Aspect 4: The method of any of Aspects 1-3, wherein the carrier of the first cell group and the carrier of the second cell group share a same radio frequency chain of the UE.

Aspect 5: The method of any of Aspects 1-4, wherein receiving the second grant includes receiving the second grant after the specified time offset before the start of transmissions on carriers of the second cell group.

Aspect 6: The method of any of Aspects 1-5, wherein the second transmit power does not change the power allocated to carriers of the second cell group.

Aspect 7: The method of any of Aspects 1-6, wherein a priority of the first grant satisfies a priority threshold.

Aspect 8: A method of wireless communication performed by a user equipment (UE), comprising: receiving an indication, via downlink control information (DCI) or a medium access control control element (MAC CE), of one or more of a reserved power of a first cell group, a maximum power of the first cell group, a reserved power of a second cell group, or a maximum power of the second cell group; and transmitting a communication with a transmit power that is based at least in part on the indication.

Aspect 9: The method of Aspect 8, wherein the indication is a maximum power of the first cell group, the communication is for the second cell group, and the transmit power is based at least in part on a reserved power of the second cell group, and wherein the method includes determining the reserved power of the second group from the maximum power of the first cell group and a total transmit power configured for the UE.

Aspect 10: The method of Aspect 8 or 9, further comprising receiving time gap information that indicates a time gap between receiving the indication and modifying the reserved power of the first cell group, the reserved power of the second cell group, the maximum power of the first cell group, or the maximum power of the second cell group.

Aspect 11: The method of Aspect 10, wherein the time gap information indicates the time gap in one or more of symbols or slots.

Aspect 12: The method of Aspect 10, wherein receiving the time gap information includes receiving the time gap information in one or more of a cell group that is impacted by the time gap information or another cell group.

Aspect 13: The method of any of Aspects 8-12, further comprising receiving update information that updates of one or more of a maximum power, a reserved power, or a power offset for the first cell group or the second cell group.

Aspect 14: The method of any of Aspects 8-13, wherein a reserved power for the first cell group is based at least in part on whether a transmission occasion for the communication, being on a carrier of the first cell group, overlaps with a configured grant occasion on a carrier of the second cell group.

Aspect 15: The method of Aspect 14, wherein the configured grant occasion is for a configured grant for a physical uplink shared channel or for a configured grant for a scheduling request.

Aspect 16: The method of any of Aspects 8-15, further comprising receiving update information that updates a power offset for the reserved power of the first cell group or for the reserved power of the second cell group separately for each configured grant uplink transmission configuration.

Aspect 17: The method of any of Aspects 8-16, further comprising receiving update information that updates a power offset, for the reserved power of the first cell group or for the reserved power of the second cell group, based at least in part on a priority of a configured grant uplink transmission configuration.

Aspect 18: The method of any of Aspects 8-17, further comprising: receiving power offset information, via a radio resource control message, that sets a power offset for the reserved power of the first cell group or for the reserved power of the second cell group; and receiving an update of the power offset via DCI or a MAC CE.

Aspect 19: A method of wireless communication performed by a network entity, comprising: transmitting an indication, via downlink control information (DCI) or a medium access control control element (MAC CE), of one or more of a reserved power of a first cell group, a maximum power of the first cell group, a reserved power of a second cell group, or a maximum power of the second cell group; and receiving a communication in association with the indication.

Aspect 20: The method of Aspect 19, further comprising transmitting time gap information that indicates a time gap between receiving the indication and modifying the reserved power of the first cell group, the reserved power of the second cell group, the maximum power of the first cell group, or the maximum power of the second cell group.

Aspect 21: The method of Aspect 20, wherein the time gap information indicates the time gap in one or more of symbols or slots.

Aspect 22: The method of Aspect 20 or 21, wherein transmitting the time gap information includes transmitting the time gap information in one or more of a cell group that is impacted by the time gap information or another cell group.

Aspect 23: The method of any of Aspects 19-22, further comprising transmitting update information that updates one or more of a maximum power, a reserved power, or a power offset for the first cell group or the second cell group.

Aspect 24: The method of any of Aspects 19-23, wherein the reserved power of the first cell group is based at least in part on whether a transmission occasion for the communication, being on a carrier of the first cell group, overlaps with a configured grant occasion on a carrier of the second cell group.

Aspect 25: The method of any of Aspects 19-24, further comprising transmitting update information that updates a power offset for the reserved power of the first cell group, or for the reserved power of the second cell group, separately for each configured grant uplink transmission configuration.

Aspect 26: The method of any of Aspects 19-25, further comprising transmitting update information that updates a power offset, for the reserved power of the first cell group or for the reserved power of the second cell group, based at least in part on a priority of a configured grant uplink transmission configuration.

Aspect 27: The method of any of Aspects 19-26, further comprising: transmitting power offset information, via a radio resource control message, that sets a power offset for the reserved power of the first cell group or for the reserved power of the second cell group; and transmitting an update of the power offset via DCI or a MAC CE.

Aspect 28: An apparatus for wireless communication at a device, comprising a processor; memory coupled with the processor; and instructions stored in the memory and executable by the processor to cause the apparatus to perform the method of one or more of Aspects 1-27.

Aspect 29: A device for wireless communication, comprising a memory and one or more processors coupled to the memory, the one or more processors configured to perform the method of one or more of Aspects 1-27.

Aspect 30: An apparatus for wireless communication, comprising at least one means for performing the method of one or more of Aspects 1-27.

Aspect 31: A non-transitory computer-readable medium storing code for wireless communication, the code comprising instructions executable by a processor to perform the method of one or more of Aspects 1-27.

Aspect 32: A non-transitory computer-readable medium storing a set of instructions for wireless communication, the set of instructions comprising one or more instructions that, when executed by one or more processors of a device, cause the device to perform the method of one or more of Aspects 1-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    memory; and
    one or more processors, coupled to the memory, configured to:
        receive, while in dual connectivity with a carrier of a second cell group, a first grant for a first communication on a carrier of a first cell group;
        determine an allocated power for carriers of the first cell group by a specified time offset before a start of transmissions on carriers of the second cell group;
        receive a second grant, after the first grant, for a second communication on the first cell group;
        transmit the first communication with a first transmit power; and
        transmit the second communication with a second transmit power that is based at least in part on the allocated power for the carriers of the first cell group and one or more of the first transmit power or a maximum transmit power for the first cell group.

2. The UE of claim 1, wherein the dual connectivity is inter-band dual connectivity.

3. The UE of claim 1, wherein the dual connectivity is intra-band dual connectivity.

4. The UE of claim 1, wherein the carrier of the first cell group and the carrier of the second cell group share a same radio frequency chain of the UE.

5. The UE of claim 1, wherein the one or more processors, to receive the second grant, are configured to receive the second grant after the specified time offset before the start of transmissions on the carriers of the second cell group.

6. The UE of claim 5, wherein the second transmit power does not change the power allocated to carriers of the second cell group.

7. The UE of claim 5, wherein a priority of the first grant satisfies a priority threshold.

8. A method of wireless communication performed by a user equipment (UE), comprising:
receiving, while in dual connectivity with a carrier of a second cell group, a first grant for a first communication on a carrier of a first cell group;
determining an allocated power for carriers of the first cell group by a specified time offset before a start of transmissions on the second cell group;
receiving a second grant, after the first grant, for a second communication on the first cell group;
transmitting the first communication with a first transmit power; and
transmitting the second communication with a second transmit power that is based at least in part on the allocated power for the carriers of the first cell group and one or more of the first transmit power or a maximum transmit power for the first cell group.

9. The method of claim 8, wherein receiving the second grant includes receiving the second grant after the specified time offset before the start of transmissions on carriers of the second cell group.

10. The method of claim 8, wherein the second transmit power does not change the power determined for carriers of the second cell group.

11. A non-transitory computer-readable medium storing a set of instructions for wireless communication, the set of instructions comprising:
one or more instructions that, when executed by one or more processors of a user equipment (UE), cause the UE to:
receive, while in dual connectivity with a carrier of a second cell group, a first grant for a first communication on a carrier of a first cell group;
determine an allocated power for carriers of the first cell group by a specified time offset before a start of transmissions on carriers of the second cell group;
receive a second grant, after the first grant, for a second communication on the first cell group;
transmit the first communication with a first transmit power; and
transmit the second communication with a second transmit power that is based at least in part on the allocated power for the carriers of the first cell group and one or more of the first transmit power or a maximum transmit power for the first cell group.

12. The non-transitory computer-readable medium of claim 11, wherein the dual connectivity is inter-band dual connectivity.

13. The non-transitory computer-readable medium of claim 11, wherein the dual connectivity is intra-band dual connectivity.

14. The non-transitory computer-readable medium of claim 11, wherein the carrier of the first cell group and the carrier of the second cell group share a same radio frequency chain of the UE.

15. The non-transitory computer-readable medium of claim 11, wherein the one or more instructions, that cause the UE to receive the second grant, cause the UE to receive the second grant after the specified time offset before the start of transmissions on the carriers of the second cell group.

16. The non-transitory computer-readable medium of claim 15, wherein the second transmit power does not change the power allocated to the carriers of the second cell group.

17. The non-transitory computer-readable medium of claim 15, wherein a priority of the first grant satisfies a priority threshold.

18. The non-transitory computer-readable medium of claim 11, wherein receiving the second grant includes receiving the second grant after the specified time offset before the start of transmissions on the carriers of the second cell group.

19. The non-transitory computer-readable medium of claim 11, wherein the second transmit power does not change the power determined for carriers of the second cell group.

20. The non-transitory computer-readable medium of claim 11, wherein the first grant is received from a network entity.

21. An apparatus for wireless communication, comprising:
means for receiving, while in dual connectivity with a carrier of a second cell group, a first grant for a first communication on a carrier of a first cell group;
means for determining an allocated power for carriers of the first cell group by a specified time offset before a start of transmissions on carriers of the second cell group;
means for receiving a second grant, after the first grant, for a second communication on the first cell group;
means for transmitting the first communication with a first transmit power; and
means for transmitting the second communication with a second transmit power that is based at least in part on the allocated power for the carriers of the first cell group and one or more of the first transmit power or a maximum transmit power for the first cell group.

22. The apparatus of claim 21, wherein the dual connectivity is inter-band dual connectivity.

23. The apparatus of claim 21, wherein the dual connectivity is intra-band dual connectivity.

24. The apparatus of claim 21, wherein the carrier of the first cell group and the carrier of the second cell group share a same radio frequency chain of the apparatus.

25. The apparatus of claim 21, wherein the means for receiving the second grant are configured to receive the second grant after the specified time offset before the start of transmissions on the carriers of the second cell group.

26. The apparatus of claim 25, wherein the second transmit power does not change the power allocated to the carriers of the second cell group.

27. The apparatus of claim 25, wherein a priority of the first grant satisfies a priority threshold.

28. The apparatus of claim 21, wherein the means for receiving the second grant include means for receiving the second grant after the specified time offset before the start of transmissions on the carriers of the second cell group.

29. The apparatus of claim 21, wherein the second transmit power does not change the power determined for the carriers of the second cell group.

30. The apparatus of claim 21, wherein the first grant is received from a network entity.

* * * * *